United States Patent
Vessenes et al.

(10) Patent No.: US 9,298,806 B1
(45) Date of Patent: Mar. 29, 2016

(54) SYSTEM AND METHOD FOR ANALYZING TRANSACTIONS IN A DISTRIBUTED LEDGER

(71) Applicant: Coinlab, Inc., Bainbridge Island, WA (US)

(72) Inventors: Peter Joseph Vessenes, Bainbridge Island, WA (US); Robert Beach Seidensticker, III, Seattle, WA (US)

(73) Assignee: COINLAB, INC., Bainbridge Island, WA (US)

( * ) Notice: Subject to any disclaimer, the term of this patent is extended or adjusted under 35 U.S.C. 154(b) by 0 days.

(21) Appl. No.: 14/794,795

(22) Filed: Jul. 8, 2015

(51) Int. Cl.
*G06F 7/00* (2006.01)
*G06F 17/30* (2006.01)

(52) U.S. Cl.
CPC .... *G06F 17/30598* (2013.01); *G06F 17/30386* (2013.01); *G06F 17/30412* (2013.01); *G06F 17/30601* (2013.01); *G06F 17/30876* (2013.01)

(58) Field of Classification Search
CPC ................................................. G06F 17/30412
See application file for complete search history.

(56) References Cited

U.S. PATENT DOCUMENTS

| | | | |
|---|---|---|---|
| 2010/0306032 | A1 | 12/2010 | Jolley |
| 2013/0282580 | A1 | 10/2013 | O'Brien et al. |

OTHER PUBLICATIONS

Spagnuolo, Michele, Bitlodine: Extracting Intelligence from the Bitcoin Network, retrieved on Apr. 23, 2015 from internet: <URL: http://143.225.81.37/www.mobilab.unina.it/tesi/Giuseppe_Galano_A_Visual_Interactive_Realtime_EXplorer_for_Bitcoin.pdf.
Galano, Giuseppe, A Visual Interactive Realtime EXplorer for Bitcoin, retrieved on Apr. 23, 2015 from internet: <URL: https://bitiodine.net/.
Fleder, Michael et al., Bitcoin Transaction Graph Analysis, retrieved on Apr. 23, 2015 from internet: <URL: https://eprint.iacr.org/2012/584.pdf.
Atlas, Kristov, Weak Privacy Guarantees for SharedCoin Mixing Service, retrieved on Apr. 23, 2015 from internet: <URL: http://www.coinjoinsudoku.com/advisory/.
Reid, Fergal et al., An Analysis of Anonymity in the Bitcoin System, retrieved on Apr. 23, 2015 from internet: <URL: https://eprint.iacr.org/2012/584.pdf.
Moser, Malte et al., An Inquiry into Money Laundering Tools in the Bitcoin Ecosystem, retrieved on Apr. 23, 2015 from internet: <URL: https://maltemoeser.de/paper/money-laundering.pdf.

*Primary Examiner* — Ajith Jacob
(74) *Attorney, Agent, or Firm* — Sheppard Mullin Richter & Hampton LLP

(57) ABSTRACT

A system and method configured for analyzing transactions in a distributed ledger. The system may identify transactions where addresses and/or groupings of addresses are co-spent together and determine whether the addresses and/or groupings of addresses should be associated with each other. Addresses may be associated with each other in a grouping of addresses and/or potential grouping of addresses because they likely belong to the same entity. The system may identify different strengths and/or confidence levels of groupings of addresses and/or potential groupings of addresses. Strong groupings, relatively strong potential groupings, and/or other groupings of addresses, potential groupings of addresses, and/or groups may be grouped, associated, analyzed, and/or presented together. As such, the system may provide a comprehensive analysis of addresses associated with a given entity.

30 Claims, 7 Drawing Sheets

SYSTEM AND METHOD FOR ANALYZING TRANSACTIONS IN A DISTRIBUTED LEDGER

FIELD OF THE DISCLOSURE

This disclosure relates to systems and methods for analyzing transactions in a distributed ledger.

BACKGROUND

Blockchain technology uses the blockchain, otherwise known as a distributed ledger, a public ledger, a transaction database, and/or by other terms, to create a publicly verifiable record of digital transactions. Digital transactions may include cryptocurrency transactions such as Bitcoin, Litecoin, Namecoin, Ethereum, and/or other similar digital transactions. Typically, users believe the identities of parties in cryptocurrency transactions are anonymous because the public keys or addresses required to send and receive Bitcoin act as pseudonyms protecting the user's identity. Bitcoin is spent by sending an amount associated with one or more input addresses to one or more output addresses associated with the intended recipient. To help protect their anonymity, Bitcoin users may use a new address for each transaction. And, when Bitcoin is spent, new addresses are generated to provide change back to the user. As such, one entity may control and/or correspond with several addresses. Also, various tools such as mixing services, splitters, or tumblers may be used to further anonymize Bitcoin transactions.

SUMMARY

One aspect of the disclosure relates to a system configured for analyzing transactions in a distributed ledger. In some implementations, analyzing transactions in the distributed ledger may be used to de-anonymize transactions. In some implementations, the system may identify transactions where addresses and/or groupings of addresses are co-spent together and determine whether the addresses and/or groupings of addresses should be associated with each other. Addresses may be associated with each other in a grouping of addresses and/or potential grouping of addresses because they likely belong to the same entity. Addresses, groupings of addresses, and/or potential groupings of addresses may be associated with a group.

The system may identify different strengths and/or confidence levels of groupings of addresses and/or potential groupings of addresses. Groupings of addresses may be strong groupings having a Level 0 strength level. Potential groupings of addresses may include an aggregate of groupings of addresses and/or other potential groupings of addresses. Relatively strong potential groupings may be associated (e.g., in a group), analyzed, grouped, and/or presented together. Groups may include one or more addresses, groupings of addresses, and/or potential groupings of addresses that are likely associated with the same entity. As such, the system may provide a comprehensive analysis of addresses associated with a given entity. In some implementations, the comprehensive analysis may include a graphical representation of the transactions a given entity has taken part in using several different addresses. In some implementations the comprehensive analysis may include totals or other summaries of financial or data transactions by and between multiple entities. The system may track and/or record relatively weak and/or relatively moderate potential groupings, and/or potential groupings of addresses that may be part of a "coinjoin" or other anonymized transaction. Because the system may optionally distinguish, associate, group, merge, and/or filter by grouping and/or potential grouping strength, for calculation or presentation, erroneous groupings are less likely to occur. As such, the system may provide more comprehensive, accurate, and automatic results.

Associating addresses belonging to a single entity with groupings of addresses, potential groupings of addresses, and/or groups enables the system and/or user to determine a real world identity associated with all of the addresses in a grouping of addresses, a potential grouping of addresses, and/or group by determining the real world identity associated with a single address. Because entities often share their ownership of at least one address publicly (e.g., so other users can send them consideration, or on a website, or on a public blockchain like Namecoin), the system may link a real world identity to an entire grouping of addresses, potential grouping of addresses, and/or group unveiling an entity's transaction history across their multitude of addresses.

In some implementations, the system may link addresses that have transacted with an entity that performs AML/KYC (i.e., Anti-Money Laundering/Know Your Customer), and further associated that address with a larger group of addresses. Thus a large group of addresses may be identified in the real world. The system may return reports that law enforcement officials or governments can use to learn the real world identity of an address, grouping of addresses, potential grouping of addresses, group, and/or an entity.

The system may be configured to identify compound transactions included in a distributed ledger. The compound transactions may include multiple addresses from which consideration is co-spent. The system may determine the addresses from which consideration is co-spent in the identified compound transactions. The addresses involved in the identified compound transactions may be associated with a grouping of addresses. In some implementations, the co-spending of addresses involved in the identified compound transactions may indicate a strong grouping (e.g., a Level 0 grouping). By way of non-limiting example, Level 0 and/or strong groupings may be automatically identified by the system such that the addresses co-spent in the identified compound transactions may be automatically grouped (e.g., associated with the same grouping of addresses).

In some implementations, the compound transactions, wherein consideration is co-spent from an address associated with a first grouping of addresses and an address associated with a second grouping of addresses, may be identified. The system may be configured to determine whether the first grouping of addresses and the second grouping of addresses should be grouped or held separate based on grouping criteria. The grouping criteria may define events that justify grouping or holding separate the first grouping of addresses, the second grouping of addresses, and/or other groupings of addresses, potential groupings of addresses, and/or groups. Potential grouping information based on the determination of whether the first grouping of addresses and the second grouping of addresses should be grouped or held separate may be recorded. The potential grouping information may indicate whether the first grouping of addresses and the second grouping of addresses should be associated with a first potential grouping.

In some implementations, analyzing transactions in a distributed ledger may be performed by processors executing computer program components. In some implementations, the system may include one or more servers. The server(s) may be configured to communicate with one or more client computing platforms according to a client/server architecture. One or more users may access the system via client computing platform(s).

The server(s) may be configured to execute machine-readable instructions. The machine-readable instructions may include one or more of an identification component, an address component, a grouping component, a determination component, a potential grouping component, an identity component, an analysis component, a presentation component, and/or other components.

In some implementations, the system may be configured to identify compound transactions included in a distributed ledger. The compound transactions may include multiple addresses from which consideration is co-spent. For example, compound transactions may include multiple input transactions. In some implementations, the system may be configured to identify other transactions or series of transactions included in the distributed ledger such as one or more of an anonymized transaction, a transaction tree, and/or other transactions or series of transactions. The system may be configured to identify transactions and/or series of transactions based on attributes and/or associations of one or more of the transactions, series of transactions, and/or addresses involved therein. In some implementations, some types of transactions such as an anonymized transaction may be identified from the identified compound transactions. In some implementations, a series of transactions such as transaction tree may be identified. The identification of some types of transactions and/or series of transactions may constitute an event that justifies grouping and/or holding separate addresses, groupings of addresses, potential groupings of addresses, and/or groups. By way of non-limiting example, responsive to identifying a transaction tree including an originating address and an ending address that are associated with the same grouping, potential grouping of addresses, and/or group, the system may associate one or more intermediary addresses involved in the transaction tree with the same grouping of addresses, potential grouping of addresses, and/or groups.

In some implementations, the system may determine the addresses from which consideration is co-spent in the identified transactions. In some implementations, the system may determine whether the addresses from which consideration is co-spent are and/or have previously been associated with one or more groupings of addresses. Responsive to the addresses from which consideration is co-spent being associated with one or more groupings of addresses, the system may determine which groupings and/or how many different groupings the addresses being co-spent are associated with.

The system may be configured to associate one or more of the addresses involved in an individual identified compound transaction with a grouping of addresses. For example, associating an address with a grouping of addresses may indicate that the address likely belongs to and/or is controlled by the same entity as the other addresses associated with the grouping of addresses. In some implementations, addresses in an identified compound transaction may be associated with a grouping of addresses (e.g., may be grouped) based on one or more characteristics of the addresses involved in the identified compound transaction. For example, in some implementations, addresses involved in an identified compound transaction may be associated with a given grouping responsive to a determination that the addresses involved in the identified compound transaction have not been previously associated with another grouping of addresses. In some implementations, responsive to a determination that one or more of the addresses involved in an identified compound transaction are not associated with more than one grouping of addresses, the addresses involved in the identified compound transaction may be associated with the same grouping of addresses.

The system may identify the compound transactions wherein consideration is co-spent from an address associated with a first grouping of addresses and an address associated with a second grouping of addresses. For example, the system may identify transactions wherein an address that has been previously associated with a first grouping of addresses is co-spent with another address that has been previously associated with a second grouping of addresses.

The system may be configured to determine whether the first grouping of addresses and the second grouping of addresses should be grouped or held separate based on grouping criteria. The grouping criteria may define events that justify grouping or holding separate the first grouping of addresses and the second grouping of addresses. In some implementations, for example, the events defined by the grouping criteria (e.g., that may justify holding separate the first grouping of addresses and the second grouping of addresses) may include identification of an anonymized transaction from the identified compound transactions.

In some implementations, occurrence of the events defined by the grouping criteria may indicate whether groupings of addresses and/or potential groupings of addresses correspond with a single entity. As such, individual events that justify grouping the first grouping of addresses and the second grouping of addresses may indicate that the first grouping of addresses and the second grouping of addresses correspond with a single entity. Individual events that justify holding separate the first grouping of addresses and the second grouping of addresses may indicate that the first grouping of addresses and the second grouping of addresses do not correspond with a single entity. In some implementations, for example, two strong groupings and/or relatively strong potential groupings may be associated with an individual address forming a relatively weak potential grouping. This potential grouping may be deemed relatively weak and/or a Level 6-Level 10 potential grouping.

The system may be configured to record potential grouping information based on the determination of whether the first grouping of addresses, the second grouping of addresses, and/or other groupings of addresses and/or potential groupings of addresses should be grouped or held separate. The potential grouping information may indicate whether the first grouping of addresses, the second grouping of addresses, and/or other groupings of addresses and/or potential grouping of addresses should be associated with a first potential grouping. In some implementations, the system may be configured to group the first grouping of addresses and the second grouping of addresses to form a potential grouping responsive to the potential grouping information indicating that the first grouping of addresses and the second grouping of addresses should be associated with the first potential grouping.

In some implementations, the potential grouping information may indicate a strength level of groupings of addresses, potential groupings of addresses, and/or other groupings. For example, a relatively strong strength level may indicate that the first grouping of addresses and the second grouping of addresses should be associated with the first potential grouping. A relatively weak strength level may indicate that the first grouping of addresses and the second grouping of addresses should not be associated with the first potential grouping.

A grouping may include an association of addresses having a strength level indicating a strong grouping such that addresses may automatically be associated with the grouping. Potential groupings of addresses may include an association of addresses, groupings of addresses, and/or other potential groupings of addresses having a relatively strong strength level (e.g., relatively strong potential groupings), a relatively moderate strength level (e.g., relatively moderate potential groupings), a relatively weak strength level (e.g., relatively weak potential groupings), and/or other strength levels. As such, addresses, groupings of addresses, and/or potential groupings of addresses included in a given potential grouping of addresses may not be automatically grouped, associated, analyzed, and/or presented together. For example, only addresses included in strong groupings, relatively strong potential groupings, and/or other groupings of addresses and/or potential groupings of addresses may be grouped, associated, analyzed, and/or presented together.

Groups may include one or more addresses, groupings of addresses, and/or potential groupings of addresses that are (e.g., likely) associated with the same entity. A given group may include one or more addresses, groupings of addresses, and/or potential groupings of addresses that have at least a given strength level of association (e.g., a strong grouping, a relatively strong potential grouping, a relatively weak potential grouping, and/or other strength associations). As such, for example, one or more addresses, groupings of addresses, and/or potential groupings of addresses may be and/or make-up a group.

In some implementations, the grouping criteria may define varying levels of individual ones of the events (e.g., a first level event, a second level event, and/or other level event) that justify grouping the first grouping of addresses and the second grouping of addresses. As such, responsive to an occurrence of a first level event, the determination that the first grouping of addresses and the second grouping of addresses should be grouped in a potential grouping (e.g., a relatively strong potential grouping) may be certain. As such, the potential grouping information recorded may indicate that the association of the first grouping of addresses and the second grouping of addresses with the first potential grouping is a relatively strong potential grouping. Responsive to an occurrence of a second level event, the determination that the first grouping of addresses and the second grouping of addresses should be grouped may be uncertain. Thus, the potential grouping information recorded may indicate that the association of the first grouping of addresses and the second grouping of addresses with the first potential grouping is a relatively moderate potential grouping.

In some implementations, relatively strong strength levels may include a first range of relatively strong strength levels (e.g., indicating relatively strong potential groupings). Relatively weak strength levels (e.g., indicating relatively weak potential groupings) may include a second range of relatively weak strength levels. Relatively weak strength levels may be recorded to keep track of, remove, and/or hold separate relatively weak potential groupings.

In some implementations, the system may be configured to extract identity data from the Internet. Identity data may be extracted via web scraping. Identity data that corresponds with individual addresses associated with individual groupings of addresses may be determined. As such, determining a first identity data that corresponds with an individual address associated with a first grouping of addresses and/or a first potential grouping of addresses may indicate an identity of an entity that corresponds with the first grouping of addresses and/or the first potential grouping of addresses.

In some implementations, the system may be configured to extract identity data from other distributed ledgers and/or blockchains differing from the distributed ledger including the identified compound transactions. For example, public keys in one blockchain generated by a given private key may be associated with one or more public keys in a second blockchain using the same public/private key system. In some methods of association, the public keys in both blockchains may be generated by a mnemonic word or phrase (e.g. a "brainwallet"). For example, the mnemonic "correct horse battery staple" can be used to generate a private key "5KJvsngHeMpm884wtkJNzQGaCErckhHJBGFsvd3V-yK5qMZXj3hS" in Bitcoin, Litecoin, and/or other blockchains. Continuing the example, the associated Bitcoin address may be: "1JwSSubhmg6iPtRjtyqhUYYH7b-Zg3Lfy1T". The associated Litecoin address may be: "LdAPi7uXrLLmeh7u57pzkZc3KovxEDYRJq". In some implementations, the system may combine the identities and effectuate grouping of different possible strengths between the Bitcoin and Litecoin blockchains using the aforementioned method of association.

In some implementations, the system may be configured to identify group transactions involving one or more given groupings of addresses and/or potential groupings of addresses. The group transactions involving the given groupings of addresses and/or potential groupings of addresses may include transactions wherein a spending address from which consideration is spent is an address associated with the given grouping of addresses, potential grouping of addresses, and/or group, and/or a receiving address at which consideration is received at an address associated with the given grouping of addresses, potential grouping of addresses, and/or group. The system may effectuate presentation of a graphical user interface configured to display the group transactions.

In some implementations, the graphical user interface may be configured to display the group transactions as a graphical representation of consideration spent and/or consideration received by addresses associated with the given grouping of addresses, potential grouping of addresses, and/or group over time. As such, the graphical representation may display a total amount of consideration associated with the given grouping of addresses, potential grouping of addresses, and/or group at a given time and/or changes in the total amount of consideration associated with the given grouping of addresses, potential grouping of addresses, and/or group over time. The graphical user interface may be configured to display strong groupings and/or relatively strong potential groupings (e.g., associated with a given group). As such, the system and/or the graphical user interface may provide a comprehensive analysis of addresses associated with a given entity via, for example, a graphical representation of the transactions a given entity has taken part in using several different addresses. In some implementations the graphical user interface may include totals or other summaries of financial or data transactions by and between multiple entities.

In some implementations, the system may be configured to determine participant addresses included in transactions with an address associated with a given grouping of addresses, potential grouping of addresses, and/or group. The participant addresses determined may include the participant sending addresses from which consideration that is received at an address associated with the given grouping of addresses, potential grouping of addresses, and/or group is spent, and/or participant receiving addresses at which consideration is received from being spent from an address associated with the given grouping of addresses, potential grouping of addresses, and/or group. Participant addresses may be the addresses the entity associated with the given grouping of addresses, potential grouping of addresses, and/or group sends consideration to and/or receives consideration from. In some implementations, participant addresses may include one or more groupings of addresses that are included in transactions with the given grouping of addresses, potential grouping of addresses, and/or group.

In some implementations, the system may identify a set of leading addresses from the participant addresses. The set of leading addresses may include one or more other groupings of addresses, other potential groupings of addresses, and/or other groups. The set of leading addresses may include individual ones of the participant spending addresses (e.g., individual address(es), grouping(s) of addresses, potential grouping(s) of addresses, and/or groups) from which at least a given amount of consideration is spent such that, at least, the given amount of consideration is received at an address associated with the first grouping of addresses, potential grouping of addresses, and/or group, and/or individual ones of the participant receiving addresses (e.g., individual address(es), grouping(s) of addresses, and/or potential grouping(s) of addresses) at which at least a given amount of consideration is received from being spent from an address associated with the given grouping of addresses, potential grouping of addresses, and/or group.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
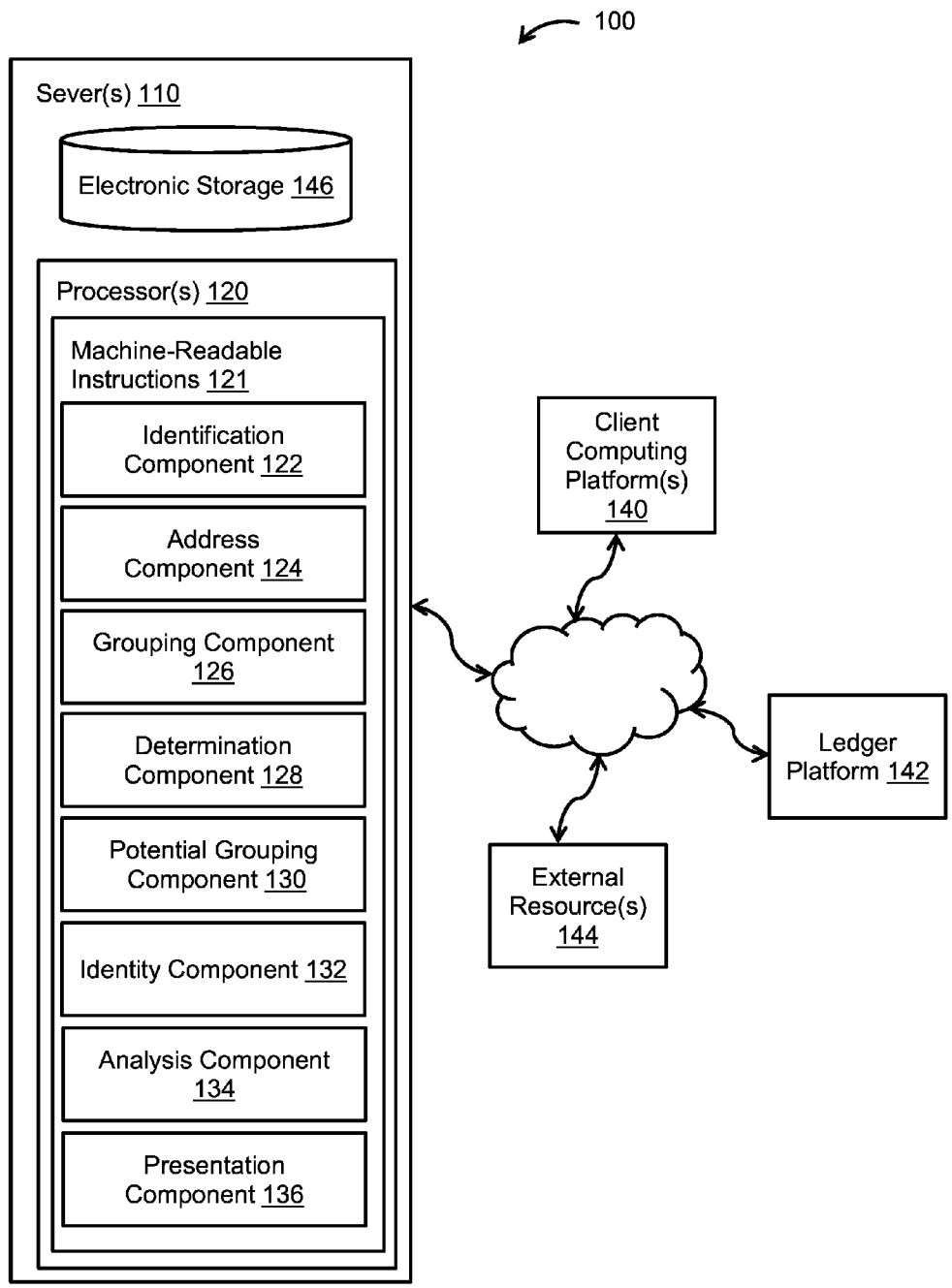
FIG. 1 illustrates a system for analyzing transactions in a distributed ledger, in accordance with one or more implementations.

FIG. 1 illustrates a system 100 configured for providing a platform for exchanging information in accordance with one or more implementations. One aspect of the disclosure relates to a system configured for analyzing transactions in a distributed ledger. In some implementations, analyzing transactions in the distributed ledger may be used to de-anonymize transactions. In some implementations, system 100 may identify transactions where addresses, groupings of addresses, and/or potential groupings of addresses are co-spent together and determine whether the addresses, groupings of addresses, and/or potential groupings of addresses should be associated with each other. Addresses may be associated with each other in a grouping of addresses and/or potential grouping of addresses because they likely belong to the same entity. As such, these addresses may be grouped and/or associated with a grouping of addresses and/or potential grouping of addresses to indicate they belong to the same entity. Grouping and/or associating addresses based on co-spending alone may cause addresses that should not be associated with a single entity to be grouped together incorrectly. For example, anonymizing tools such a mixers, tumblers, and/or group transactions (e.g., coinjoin) may generate erroneous groupings, including addresses that are controlled by multiple entities. Manually dissecting these erroneous groupings may be a complex, time consuming, and daunting task. System 100 may identify different strengths and/or confidence levels of groupings of addresses and/or potential groupings of addresses. Strong groupings and/or relatively strong potential groupings may be grouped and/or presented together. As such, system 100 may provide a comprehensive analysis of addresses associated with a given entity. In some implementations, the comprehensive analysis may include a graphical representation of the transactions a given entity has taken part in using several different addresses. In some implementations, system 100 may avoid the pitfalls of grouping and/or merging groups based on co-spending alone by determining and tracking different levels of potential grouping strengths. Furthermore, potential groupings of addresses may not automatically be merged and/or grouped when addresses from individual groupings of addresses are co-spent together. System 100 may track and/or record relatively weak potential groupings that may be part of a "Coinjoin" and/or other anonymized transaction using algorithms and/or machine learning techniques. Because only strong groupings and/or relatively strong potential groupings may be grouped (e.g., associated with a group) and/or presented, erroneous groupings and/or mergers are less likely to occur. As such, system 100 may provide more reliable, comprehensive, accurate, and automatic results.

Associating addresses belonging to a single entity with groupings of addresses, potential groupings of addresses, and/or groups enables system 100 and/or a user to determine real world identities associated with groupings of addresses, potential groupings of addresses, and/or groups. As such, determining the real world identity associated with a single address may reveal the real world identity associated with a grouping of addresses, a potential grouping of addresses, and/or groups. Determining a real world identity of at least one address included in a grouping of addresses and/or potential grouping of addresses is often possible because an entity may share its ownership or control of at least one address publicly to receive consideration. Thus, system 100 may link a real world identity to an entire grouping of addresses, potential grouping of addresses, and/or group, unveiling the transaction history of an entity across their plurality of addresses.

In some implementations, system 100 may be configured to identify compound transactions included in a distributed ledger. Compound transactions may include multiple addresses from which consideration is co-spent. System 100 may determine the addresses from which consideration is co-spent in the identified compound transactions. System 100 may associate the addresses involved in the identified compound transactions with a grouping of addresses. In some implementations, the compound transactions wherein consideration is co-spent from an address associated with a first grouping of addresses and an address associated with a second grouping of addresses may be identified. System 100 may be configured to determine whether the first grouping of addresses and the second grouping of addresses should be grouped or held separate based on grouping criteria. The grouping criteria may define events that justify grouping or holding separate the first grouping of addresses and the second grouping of addresses. Potential grouping information based on the determination of whether the first grouping of addresses and the second grouping of addresses should be grouped or held separate may be recorded. The potential grouping information may indicate whether the first grouping of addresses and the second grouping of addresses should be associated with a first potential grouping.

Potential groupings of addresses may include an association of addresses, groupings of addresses, and/or other potential groupings of addresses. Groups may include one or more addresses, groupings of addresses, and/or potential groupings of addresses that are and/or are likely associated with the same entity. Groups may include one or more addresses, groupings of addresses, and/or potential groupings of addresses that have at least a given strength level of association (e.g., a strong grouping, a relatively strong potential grouping, a relatively weak potential grouping, and/or other strength associations). As such, by way of non-limiting example, one or more addresses, groupings of addresses, and/or potential groupings of addresses may be and/or make-up a group.

System 100 may identify and/or de-anonymize one or more transactions in a distributed ledger. In some implementations, the distributed ledger may include a blockchain and/or other sequential transaction database. The distributed ledger may provide a publically and/or non-publically verifiable ledger. Changes (e.g., new transactions) may be added to the distributed ledger and recorded in the blockchain. For example, Bitcoin requires a network of nodes to validate new transactions, add them to their copy of the ledger, and broadcast their updated ledger to the entire network of nodes. Nodes may validate new transactions according to a validation protocol. The validation protocol may define a process by which network participants (e.g., nodes/servers) may agree on changes and/or additions to the distributed ledger. In some implementations, the validation protocol may include the "mining" proof of work protocol implemented by Bitcoin, a public consensus protocol such as Ripple® Protocol, and/or other validation protocols. By way of another non-limiting example, the validation protocol may include a private and/or custom validation protocol. In some implementations, responsive to the network participants reaching an agreement (i.e., via the verification protocol) on one or more changes and/or additions (e.g., to include one or more transactions) to the distributed ledger (e.g., blockchain), a new instance of the distributed ledger may be created and distributed to all network participants (e.g., a new block in the blockchain).

The process may be repeated and each time a group of new transactions are verified, a new block may be added to the blockchain creating a new instance of the distributed ledger. The new instance of the distributed ledger may be immutable. Thus, the distributed ledger may provide a verifiable record of transactions. In some implementations, each transaction included in the distributed ledger may include an amount of consideration to be transferred, an address from which the consideration is spent (e.g., a-last-sent-to address), and/or an address at which the consideration will be received. In some implementations, an address may include an alphanumeric identifier. Addresses may contain several (e.g., 26-35) characters. In some implementations, an address may be a public key and/or a hashed public key. Transactions within the distributed ledger may require a private key to cryptographically sign the transaction indicating that the sender actually owns the consideration being sent (e.g., spent).

Consideration may include one or more cryptocurrencies (e.g., Bitcoin, Ripple, Namecoin, Litecoin, Ethereum, and/or other cryptocurrencies), money, value, coins, information, titles, deeds, contracts, and/or other digital consideration.

In some implementations, analyzing transactions in a distributed ledger may be performed by processors executing computer program components. In some implementations, system 100 may include one or more server(s) 110. The server(s) 110 may be configured to communicate with one or more client computing platform(s) 140 according to a client/server architecture. One or more users may access system 100 via client computing platform(s) 140.

The server(s) may be configured to execute machine-readable instructions 121. The machine-readable instructions 121 may include one or more of an identification component 122, an address component 124, a grouping component 126, a determination component 128, a potential grouping component 130, an identity component 132, an analysis component 134, a presentation component 136, and/or other components.

Identification component 122 may be configured to identify compound transactions included in a distributed ledger. The compound transactions may include multiple addresses from which consideration is co-spent. For example, compound transactions may include multiple input transactions. By way of a non-limiting use example, User A may want to send User C ten Bitcoin but User A may only have six Bitcoin associated with address A and four Bitcoin associated with address B. Continuing the example, User A may co-spend the six Bitcoin associated with address A with the four Bitcoin associated with address B indicating that both address A and address B correspond with and/or belong to User A.

Figure 2:
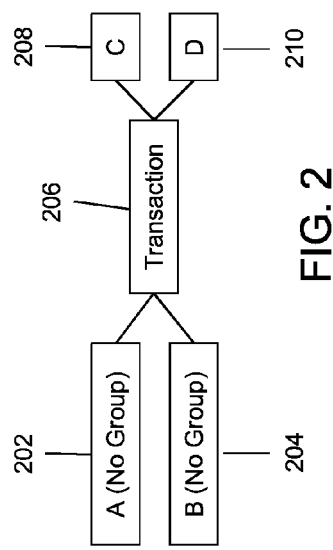
FIG. 2 illustrates a representation of a compound transaction, in accordance with one or more implementations.

FIG. 2 illustrates a representation of a compound transaction 206, in accordance with one or more implementations. Compound transaction 206 may involve multiple addresses from which consideration is co-spent. Compound transaction 206 may be identified by an identification component that is the same as or similar to identification component 122. The multiple addresses from which consideration is co-spent may include address A 202, address B 204, and/or other addresses. In transaction 206, a user may co-spend consideration associated with address A 202 and address B 204 to one or more receiving addresses. The one or more receiving addresses may include address C 208, address D 210, and/or other addresses.

Returning to FIG. 1, in some implementations, identification component 122 may be configured to identify other transactions or series of transactions included in the distributed ledger. In some implementations, identification component 122 may be configured to identify one or more anonymized transactions. The anonymized transactions may be identified from the identified compound transactions. The anonymized transactions may include transactions that involve spending addresses from which consideration is spent wherein the spending addresses are associated with different groupings of addresses, potential groupings of addresses, and/or groups. As such, in an anonymized transaction, individual ones of the spending addresses may all be associated with different individual ones of the groupings of addresses, potential groupings of addresses, and/or groups.

Address component 124 may be configured to determine the addresses from which consideration is co-spent in the identified transactions. In some implementations, system 100 may determine whether the addresses from which consideration is co-spent are and/or have previously been associated with one or more groupings of addresses, potential groupings of addresses, and/or groups. In some implementations address component 124 and identification component 122 may communicate in order to identify certain types of transactions. In some implementations, responsive to the addresses from which consideration is co-spent being associated with one or more groupings of addresses, potential groupings of addresses, and/or groups, system 100 may determine which groupings of addresses, potential groupings of addresses, and/or groups, and/or how many different groupings of addresses, potential groupings of addresses, and/or groups the addresses being co-spent are associated with.

In some implementations, the address component 124 may be configured to determine whether the determined addresses from which consideration is co-spent in the identified compound transactions have been previously associated with one or more groupings of addresses, potential groupings of addresses, and/or groups. By way of example, if none of the addresses from which consideration is co-spent in a transaction have been associated with a grouping of addresses and/or potential grouping of addresses; one or more addresses may be associated with a new grouping of addresses. By way of another example, if some addresses from which consideration is co-spent in a transaction have only been associated with a single grouping and/or a single potential grouping of addresses and the addresses that are not associated with the single grouping have not yet been associated with any grouping of addresses and/or potential grouping of addresses, one or more of the unassociated addresses may be associated with the single grouping of addresses.

Figure 3:
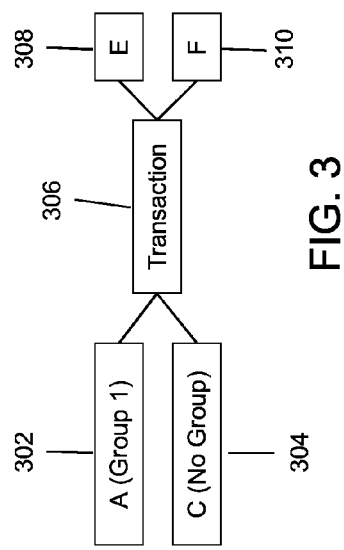
FIG. 3 illustrates a representation of a compound transaction, in accordance with one or more implementations.

FIG. 3 illustrates a representation of a compound transaction 306, in accordance with one or more implementations. Compound transaction 306 may involve multiple addresses from which consideration is co-spent. Compound transaction 306 may be identified by an identification component that is the same as or similar to identification component 122. The multiple addresses from which consideration is co-spent may include address A 302, address C 304, and/or other addresses. Address A 302 may have been previously associated with Group 1 (e.g., Group 1 may include a grouping of addresses and/or relatively strong potential grouping(s) of addresses) and address C 304 may not have been previously associated with a grouping of addresses and/or potential grouping of addresses. In transaction 306, a user may co-spend consideration associated with address A 302 and address C 304 to one or more receiving addresses. The one or more receiving addresses may include address E 308, address F 310, and/or other addresses.

Figure 4:
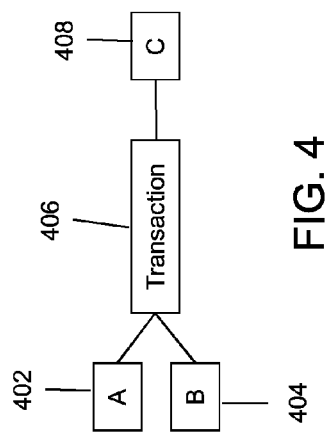
FIG. 4 illustrates a representation of a compound transaction, in accordance with one or more implementations.

FIG. 4 illustrates a representation of a compound transaction 406, in accordance with one or more implementations. Compound transaction 406 may involve multiple addresses from which consideration is co-spent. Compound transaction 406 may be identified by an identification component that is the same as or similar to identification component 122. The multiple addresses from which consideration is co-spent may include address A 402, address B 404, and/or other addresses. In transaction 406, address A 402 and address B 404 may be co-spent to a single address, address C 408.

Figure 5:
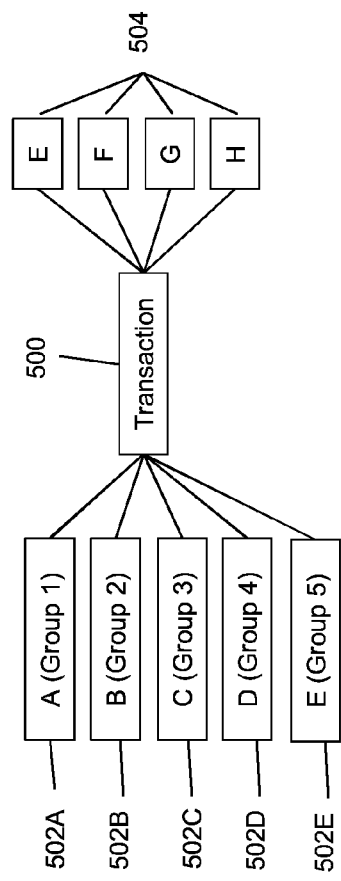
FIG. 5 illustrates a representation of an anonymized transaction, in accordance with one or more implementations.

FIG. 5 illustrates a representation of an anonymized transaction 500, in accordance with one or more implementations. Anonymized transaction 500 may involve spending addresses 502 from which consideration is co-spent. Spending address 502 may be associated with different groupings of addresses, potential groupings of addresses, and/or groups. For example, as illustrated in FIG. 5, spending address A 502A may be associated with Group 1, spending address B 502B may be associated with Group 2, spending address C 502C may be associated with Group 3, spending address D 502D may be associated with Group 4, and/or spending address E 502E may be associated with Group 5. (Groups 1-5 may include one or more groupings of addresses and/or potential groupings of addresses). As such, the individual ones of spending addresses 502 are associated with different groupings of addresses, potential groupings of addresses, and/or groups. Receiving addresses 504 may receive the consideration spent from spending addresses 502. In some implementations, for example transaction 500 may represent a coinjoin transaction where multiple entities that want to make a payment enter into a joint transaction to send consideration to receiving addresses such that the relationship between inputs and outputs, and/or the direction of spent consideration appears to be unknown. Coinjoin transactions are one example of a tool used to further anonymize transactions within a distributed ledger.

Figure 6:
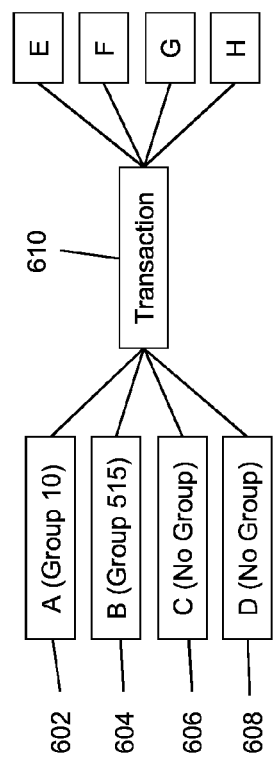
FIG. 6 illustrates a representation of a compound transaction, in accordance with one or more implementations.

FIG. 6 illustrates a representation of a compound transaction, in accordance with one or more implementations. As illustrated in FIG. 6, for example, address A 602, address B 604, address C 606, and address D 608 may be co-spent in transaction 610. An address component the same as or similar to address component 124 may determine that address A 602 may have been previously associated with Group 10 and address 604 B may have previously been associated with Group 515. Group 10 and/or Group 515 may include one or more addresses, groupings of addresses, and/or potential groupings of addresses. Address C 606 and/or address D 608 may not have been previously associated with any group (e.g., grouping of addresses, potential grouping of addresses, and/ or other group). The identification of transaction 610 may cause a determination that the first grouping of addresses (e.g., Group 10) and the second grouping of addresses (e.g., Group 515) should be held separate.

Returning to FIG. 1, identification component 122 may be configured to identify one or more transaction trees and/or other transaction series. The transaction trees may include transactions where both a source and a destination address are associated with the same grouping of addresses and/or potential grouping of addresses. For example, the transaction trees may involve an originating address from which consideration is spent to multiple intermediary addresses. The originating address may include the input address (e.g., the source) of the first and/or original transaction in a given transaction tree. The transaction trees may involve ending addresses at which consideration is received from the multiple intermediary addresses. The ending address may include the output address (e.g., the destination) of one or more transactions involving the intermediary addresses. The transaction trees may be identified based on the originating address and the ending address being associated with the same grouping of addresses and/or potential grouping of addresses. As such, in some implementations, wherein the originating address and the ending address are both associated with a single grouping of addresses and/or a single potential grouping of addresses, a transaction tree may be identified in the distributed ledger. The transaction series may include a series of one or more transactions identified by identification component 122.

Figure 7:
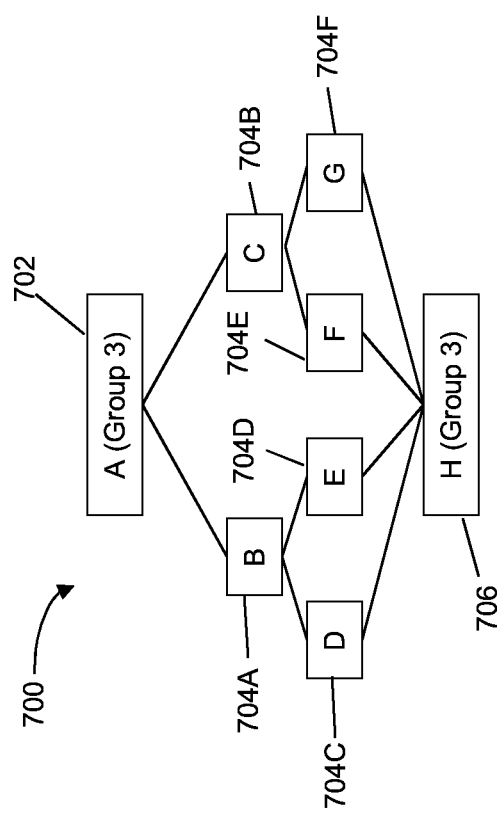
FIG. 7 illustrates a representation of a transaction tree, in accordance with one or more implementations.

FIG. 7 illustrates a representation of a transaction tree 700, in accordance with one or more implementations. Transaction tree 700 may include a series of transactions the same as or similar to the series of transactions identified by identification component 122. Transaction tree 700 may include transactions involving an originating address 702, intermediary addresses 704 (e.g., 704A, 704B, 704C, 704D, 704E, and 704F), an ending address 706, and/or other addresses. Transaction tree 700 may include originating address 702 from which consideration is spent to one or more intermediary addresses 704. Intermediary addresses 704 may send and/or receive consideration from and/or to other intermediary addresses 704. Transaction tree 700 may include ending address 706 at which consideration is received from the one or more intermediary addresses 704. Originating address 702 and ending address 706 may be associated with the same grouping and/or potential grouping of addresses (e.g., Group 3).

Figure 8:
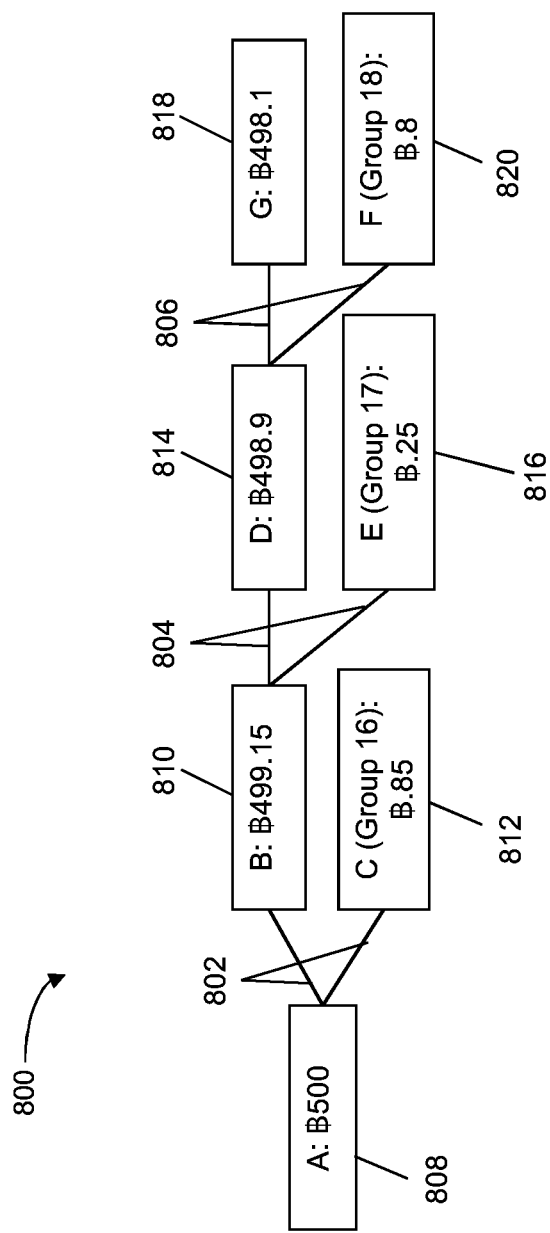
FIG. 8 illustrates a representation of a transaction series in accordance with one or more implementations.

FIG. 8 illustrates a representation of a transaction series 800, in accordance with one or more implementations. Transaction series 800 may be identified by an identification component that is the same as or similar to identification component 122. Transaction series 800 may include a first transaction 802, a second transaction 804, a third transaction 806, and/or other transactions. First transaction 802 may begin with address A 808. Address A 808 may be associated with ฿500.00. In first transaction 802, address A 808 may send ฿499.15 to address B 810 and ฿0.85 to address C 812. address C 812 may be associated with Group 16 (e.g., a grouping of addresses). In second transaction 804, address B 810 may send ฿498.9 to address D 814 and ฿0.25 to address E 816. Address E 816 may be associated with Group 17 (e.g., a grouping of addresses). In third transaction 806, address D 814 may send ฿498.1 to address 818 G and ฿0.8 to address F 820. Address F 820 may be associated with Group 18 (e.g., a grouping of addresses). In some implementations, transaction series 800 may be identified and one or more addresses (e.g., address A 808, address B 810, address D 814, address G 818, and/or other addresses) may be associated with the same potential grouping of addresses. For example, address A 808, address B 810, address D 814, and address G 818 may be associated with the same potential grouping of addresses (e.g., Group 19).

Returning to FIG. 1, grouping component 126 may be configured to associate one or more of the addresses involved in an individual one of the identified compound transactions with a grouping of addresses. Associating an address with a grouping of addresses may indicate that the address and/or the other addresses included in the grouping of addresses likely belong to and/or are controlled by the same entity. One or more addresses may be associated with a grouping of addresses responsive to the grouping being a strong (e.g., Level 0) grouping. In some implementations, addresses in an identified compound transaction may be associated with a grouping of addresses (e.g., may be grouped) based on one or more characteristics of the addresses involved in the identified compound transaction. As such, addresses involved in an identified compound transaction may be associated with a given grouping responsive to a determination that the addresses involved in the identified compound transaction have not been previously associated with another grouping of addresses.

For example, if none of the addresses from which consideration is co-spent in a compound transaction have been associated with a grouping of addresses and/or none of the addresses from which consideration is co-spent in the compound transaction have been associated with a potential grouping of addresses; all of the addresses may be associated with a grouping of addresses (e.g., Group 1). In some implementations, responsive to a determination that one or more of the addresses involved in an identified compound transaction are not associated with more than one grouping of addresses and/or are not associated with more than one potential grouping of addresses, the addresses involved in the identified compound transaction may be associated with the same grouping of addresses. For example, if some of the addresses are associated with Group 1 (e.g., a group such as Group 1, for example, may include one or more groupings of addresses and/or one or more potential groupings of addresses) but two are not associated with any grouping of addresses and/or potential grouping of addresses, system 100 may associate the two unassociated addresses with Group 1. Associating the un-associated addresses with Group 1 may be a strong grouping and/or Level 0 grouping. In some implementations, responsive to a determination that individual ones of the addresses involved in an identified compound transaction are associated with two or more different groupings of addresses, potential groupings of addresses, and/or groups, the addresses not associated with one of the two or more different groupings of addresses, potential groupings of addresses, and/or groups may be individually associated with new groupings of addresses.

Based on information from address component 124 and/or grouping component 126, identification component 122 may be configured to identify the compound transactions wherein consideration is co-spent from an address associated with a first grouping of addresses and an address associated with a second grouping of addresses. For example, system 100 may identify transactions wherein an address that has been previously associated with a first grouping of addresses is co-spent with another address that has been previously associated with a second grouping of addresses. In some implementations, identification component 122 may be configured to identify transactions wherein consideration is co-spent from an address associated with a first potential grouping of addresses and/or a first group, and an address associated with a second potential grouping of addresses and/or a second group.

Determination component 128 may be configured to determine whether the first grouping of addresses, the second grouping of addresses, and/or other groupings of addresses, potential groupings of addresses, and/or groups should be grouped or held separate based on grouping criteria. In some implementations, determination component 128 may be configured to determine whether one or more groupings of addresses, potential groupings of addresses, groups, and/or other addresses should be grouped or held separate. Such a determination may be based on grouping criteria. For example, determination component 128 may be configured to determine whether one or more groupings of addresses and/or potential groupings of addresses should be grouped such that erroneous groupings do not occur due to an anonymizing tool. The grouping criteria may define events that justify grouping or holding separate the first grouping of addresses, the second grouping of addresses, other groupings of addresses, and/or other potential groupings of addresses. In some implementations, for example, the events defined by the grouping criteria may include identification of an anonymized transaction from the identified compound transactions.

Occurrence of the events defined by the grouping criteria may indicate whether addresses, groupings of addresses, potential groupings of addresses, and/or groups may correspond with a single entity. As such, individual events that justify grouping the first grouping of addresses may indicate that the first grouping of addresses and the second grouping of addresses correspond with a single entity. Individual events that justify holding separate the first grouping of addresses and the second grouping of addresses may indicate that the first grouping of addresses and the second grouping of addresses do not correspond with the single entity. By way of example, events that justify holding separate one or more groupings of addresses, potential groupings of addresses, and/or groups may include identifying a transaction as a Coinjoin, mixed, tumbled, split, and/or otherwise anonymized transaction. By way of further example, if an individual event involves two different strong groupings, relatively strong potential groupings, and/or otherwise associated/grouped groups (e.g. Group 100 and Group 215), and multiple individual addresses, the system may determine the event constitutes a relatively weak potential grouping, and/or a 'no strength' potential grouping (e.g., a level 10 potential grouping).

Potential grouping component 130 may be configured to record potential grouping information based on the determination of whether one or more groupings of addresses, one or more potential groupings of addresses, and/or one or more groups should be grouped or held separate. In some implementations, potential grouping component 130 may be configured to record potential grouping information based on the determination of whether the first grouping of addresses, the second grouping of addresses, other groupings of addresses, potential groupings of addresses, and/or groups should be grouped or held separate. The potential grouping information may indicate whether a given grouping of addresses, potential grouping of addresses, and/or groups should be grouped with one or more other grouping(s) of addresses, potential grouping(s) of addresses, and/or groups on the basis that they likely belong to the same entity. In some implementations, the potential grouping information indicates whether the first grouping of addresses and the second grouping of addresses should be associated with a first potential grouping.

In some implementations, potential grouping component 130 may be configured to communicate with grouping component 126 to group, associate, and/or merge the one or more grouping(s) of addresses, potential grouping(s) of addresses, and/or group(s) responsive to the potential grouping information indicating that the one or more grouping(s), potential grouping(s), and/or group(s) should be associated with the same potential grouping and/or group. In some implementations, potential grouping component 130 may be configured to communicate with grouping component 126 to group, associate, and/or merge the first grouping of addresses, the second grouping of addresses, and/or other groupings of addresses, potential groupings of addresses, and/or groups responsive to the potential grouping information indicating that the first grouping of addresses, the second grouping of addresses, and/or other groupings of addresses, potential groupings of addresses, and/or groups should be associated with a potential grouping (e.g., the first potential grouping) and/or group. By way of non-limiting example, responsive to the potential grouping information indicating that one or more groupings of addresses and/or potential groupings of addresses should be associated with a given potential grouping and/or a given group, and/or that the given potential grouping has at least a given strength level, the given potential grouping and/or potential grouping information may be stored in place of one or more of the associated groupings of addresses and/or the associated potential groupings of addresses, in a new location, in a log and/or record (e.g., in a database, etc.) of groupings of addresses and/or potential groupings of addresses associated with a given group, and/or in other locations.

In a non-limiting use case example, Group 1 (e.g., a first grouping) may include address 1A and 1B and Group 2 (e.g., a second grouping) may include addresses 2C and 2D. Responsive to addresses 1A and 2C being co-spent together, determination component 128 may determine whether Group 1 and Group 2 should be grouped or held separate based on grouping criteria. Continuing the example, potential grouping information component 130 may be configured to record potential grouping information based on the determination of whether Group 1 and Group 2 should be grouped or held separate.

In some implementations, the potential grouping information may indicate a strength level of groupings of addresses, potential groupings of addresses, and/or other groupings. A strong and/or relatively strong strength level may indicate that one or more addresses, groupings of addresses, and/or potential groupings of addresses should be associated with a given grouping of addresses, potential grouping of addresses, and/or group as described herein. In some implementations, a relatively strong strength level may indicate that the first grouping of addresses and the second grouping of addresses should be associated with the first potential grouping and/or a first group. A relatively weak strength level may indicate that the first grouping of addresses and the second grouping of addresses should not be associated with the first potential grouping and/or the first group.

By way of non-limiting example, identification of an anonymized transaction from the identified compound transactions may cause a relatively weak potential grouping to be determined and/or indicated such that the potential grouping information indicates that the groupings of addresses and/or potential groupings of addresses involved should not be associated with the same potential grouping and/or group. By way of another non-limiting example, the identification of a transaction tree with an originating address and an ending address that are associated with the same grouping of addresses, potential grouping of addresses, and/or group may indicate a relatively strong potential grouping such that intermediary addresses involved (e.g., the addresses at which consideration is received from an originating address and from which consideration is spent to an ending address) should be associated with the same grouping of addresses, potential grouping of addresses, and/or group as both the originating address and the ending address.

In some implementations, the strength levels may include Level 0, Level 1, Level 2, Level 3, Level 4, Level 5, Level 6, Level 7, Level 8, Level 9, Level 10, and/or other levels and/or fractional or decimal levels. Integer levels may be used by system 100 to enact and/or indicate groupings of addresses, potential groupings of addresses, and/or associations with groups. Fractional and/or decimal levels may be used by system 100 to enable machine learning analysis. In some implementations, machine learning technology may use floating points and/or decimals to indicate certainty, strength levels, and/or associations. The levels may enable system 100 to prioritize groupings of addresses and/or potential groupings of addresses, and/or their associations with a group, according to their strength levels. In some implementations, groupings of addresses may have a Level 0 strength level. Potential groupings of addresses may have a Level 1-Level 10 strength level. By way of example, the groupings of addresses may indicate the strongest level of association between addresses. By way of another example, potential groupings of addresses may indicate ranging levels of association between addresses, groupings of addresses, and/or other potential groupings of addresses. Potential groupings of addresses may have varying strength levels ranging from relatively strong potential groupings (e.g., Level 1-Level 5 potential groupings) to relatively weak potential groupings (e.g., Level 6-Level 10 potential groupings). In some implementations, the varying strengths may include relatively moderate strength potential groupings (e.g., a Level 4-Level 6 potential groupings). The address(es) and/or grouping(s) of addresses included in a given grouping of addresses may have strong associations with each other. The address(es), grouping(s) of addresses, and/or potential grouping(s) of addresses included in a given relatively strong potential grouping may have relatively strong associations with each other and/or a given group. The address(es), grouping(s) of addresses, and/or potential grouping(s) of addresses included in a given relatively weak potential grouping may have relatively weak associations with each other and/or a given group. The address(es), grouping(s) of addresses, and/or potential grouping(s) of addresses included in a given relatively moderate strength potential grouping may have relatively moderate strength associations with each other and/or a given group.

In some implementations, system 100 may be configured and/or may be user configurable such that the strength levels included as a relatively strong strength level (e.g., indicating a relatively strong potential grouping) and/or a relatively weak strength level (e.g., indicating a relatively weak potential grouping) may be user configurable. In some implementations, strength levels indicating a relatively strong potential grouping may include a first range of relatively strong strength levels and/or strength levels indicating a relatively weak potential grouping level may include a second range of relatively weak strength levels. Relatively weak potential groupings may be recorded and/or removed from records indicating potential groupings of addresses. By way of non-limiting example, in some implementations, Level 0 groupings may indicate strong groupings, Level 1 through Level 5 strength level groupings may indicate relatively strong potential groupings. Level 6 through Level 10 may indicate relatively weak potential groupings.

In some implementations, associating the addresses involved in an individual identified compound transaction with a grouping of addresses may be a strong (e.g., Level 0 strength) grouping. As such, addresses not previously associated with a grouping of addresses, potential grouping of addresses, and/or group being co-spent together may define an event that justifies grouping the addresses. In some implementations, the grouping of address may include a Level 0 grouping. For example, if none of the addresses from which consideration is co-spent in a transaction have been associated with a grouping of addresses, a potential grouping of addresses, and/or a group, the association of one or more of the addresses with a new grouping of addresses may be a Level 0 (e.g., a strong strength level) grouping. Returning to FIG. 2, transaction 206 may represent an event that justifies grouping address A 202 and address B 204 such that address A 202 and address B 204 are associated with a given grouping of addresses (e.g., Group 1). Associating address A 202 and address B 204 with the given grouping of addresses (e.g., Group 1) may be a strong grouping (e.g., a Level 0 grouping).

By way of another example, if some addresses from which consideration is co-spent in a transaction have only been associated with a single grouping of addresses and/or a single group and the addresses that are not associated with the single grouping and/or the single group have not yet been associated with any grouping of addresses and/or any group, the association of one or more of the unassociated addresses with the single grouping and/or the single group may be a Level 0 (e.g., a strong strength level) grouping (e.g., see FIG. 3). Returning to FIG. 3, compound transaction 306 may represent an event that justifies grouping address C 304 with the same grouping of addresses (e.g., Group 1) as address 1A 302. Associating address C 304 with the same grouping of addresses (e.g., Group 1) as address 1A 302 may be a strong grouping (e.g., a Level 0 grouping).

Returning to FIG. 4, compound transaction 406 may represent an event that justifies grouping address C 408 with the same grouping (e.g., Group 1) of addresses as address A 402 and address B 404. Associating address A 402, address B 404, and address C 408 with Group 1 may be a Level 0 strength grouping. By way of non-limiting example, grouping address A 402, address B 404, and address C 304 with Group 1 may be a Level 0 strength grouping (e.g., a strong grouping) because it is likely that two addresses co-spending together to send consideration to a single address is a transaction used to merge and/or aggregate consideration associated with multiple addresses controlled by the same entity.

By way of another example, the association of intermediary addresses in a transaction tree with the same grouping of addresses, potential grouping of addresses, and/or group as the originating address and the ending address may include a relatively strong potential grouping (e.g., a Level 3 potential grouping). Returning to FIG. 7, originating address 702 and ending address 706 may be associated with the same grouping of addresses, potential grouping of addresses, and/or group. In some implementations, the same potential grouping of addresses may include Group 3. Intermediary addresses 704 may be associated with the same potential grouping (e.g., Group 3 and/or including Group 3) in a relatively strong (e.g., Level 3) potential grouping. As such, system 100 may record potential grouping information indicating a relatively strong strength level grouping for intermediary addresses 704 with originating address 702 and/or ending address 706.

Returning to FIG. 8, in some implementations, associating one or more addresses with the same grouping of addresses, potential grouping of addresses, and/or group in transaction series 800 may include a moderate strength level grouping. Continuing the example, addresses 808, 810, 814, and 818 may be associated in a moderate strength level potential grouping of addresses (e.g., Group 1). For example, when majority of the consideration in a transaction series is repeatedly spent to an individual one of multiple addresses, the individual addresses to which the majority of the consideration is spent may be controlled by the same entity. As such, continuing the example, system 100 may record potential grouping information indicating a moderate strength level grouping for addresses 808, 810, 814, and 818.

In some implementations, one or more addresses, groupings of addresses and/or potential groupings of addresses may be associated with a potential grouping of addresses and/or a group responsive to a relatively strong potential grouping and/or a relatively moderate potential grouping being indicated. In some implementations, for example, if an address associated with a first grouping and/or group has only been involved in one or more transactions with a second grouping and/or group and the first grouping and/or group has a zero balance (e.g., no remaining consideration to be spent), grouping and/or associating the first grouping and the second grouping with a first potential grouping may be a Level 1 (e.g., a relatively strong) potential grouping. By way of non-limiting example, if a compound transaction involving an address from a first grouping and an address from a second grouping is not an anonymized transaction (e.g., including multiple spending addresses that are co-spent together and are all associated with different groupings of addresses, potential groupings of addresses, and/or groups), associating the first grouping and the second grouping with a first potential grouping may include a Level 2 (e.g., relatively strong) grouping. Continuing the example, a potential grouping of two groupings and/or groups co-spent together in a compound transaction that is an anonymized transaction may be a relatively weak (e.g., Level 6 though Level 10) potential grouping. For example, returning to FIG. 5, identification of anonymized transaction 500 may indicate a relatively weak (e.g., Level 10) potential grouping. Identification of anonymized transaction 500 by an identification component the same as or similar to identification component 122 may represent an event that justifies holding separate spending addresses 502 such that spending addresses 502 are not associated with the same potential grouping and/or group.

In some implementations, returning to FIG. 6, identification of compound transaction 610 may indicate a relatively weak (e.g., Level 6-Level 10) potential grouping. Identification of compound transaction 610 by an identification component the same as or similar to identification component 122 may represent an event that justifies holding separate Group 10 and Group 505, and/or address A 602 and address B 604 such that Group 10, Group 505, address A 602, and/or address B 604 are not associated with the same potential grouping and/or group.

In some implementations, the user may configure and/or set the strength levels such that the strength levels associated and/or presented with a grouping of addresses and/or potential grouping of addresses may be configured by the user. User configurable strength levels may enable a user, for example, to create different layers of analysis from narrow (e.g., including only strong groupings and/or relatively strong potential groupings) to broad (e.g., including relatively moderate potential groupings).

Returning to FIG. 1, in some implementations, potential grouping component 130 may be configured to record potential grouping information tracking how many times a determination that one or more of the same groupings of addresses and/or potential groupings of addresses should be grouped or held separate, and/or how many times one or more addresses from a first group have been co-spent with one or more addresses from a second group (e.g., wherein the groups may include one or more groupings of addresses and/or potential groupings of addresses that may likely be associated with the same entity). For example, potential grouping component 130 may be configured to determine how many times one or more addresses, groupings of addresses, potential groupings of addresses, and/or groups have attempted to group and/or be associated. After a threshold number of times (e.g., five, more than five, and/or less than five) system 100 determines that the addresses, groupings of addresses, potential groupings of addresses, and/or groups should be held separate, determination component 128 may determine that the addresses, groupings of addresses, potential groupings of addresses, and/or groups should be associated and/or grouped. For example, after a threshold number of times that one or more addresses from a first grouping are co-spent with one or more addresses from a second grouping, determination component 128 may determine that the addresses and/or the groupings of addresses should be associated with the same potential grouping and/or group. As such, potential grouping component 130 may be configured to record potential grouping information indicating that two or more groupings of addresses should be associated with a given potential grouping and/or group (e.g., the potential grouping information may indicate a Level 4 potential grouping and/or relatively moderate strength potential grouping).

In some implementations, the events that justify grouping the first grouping of addresses, the second grouping of addresses, other grouping(s) of addresses, potential grouping(s) of addresses, and/or groups may have varying levels. As such, responsive to an occurrence of a first level event, the determination that the first grouping of addresses and the second grouping of addresses should be grouped may be certain. As such, the potential grouping information recorded may indicate that the association of the first grouping of addresses and the second grouping of addresses with the first potential grouping is a relatively strong potential grouping. Responsive to an occurrence of a second level event, the determination that the first grouping of addresses and the second grouping of addresses should be grouped may be uncertain. Thus, the potential grouping information recorded may indicate that the association of the first grouping of addresses and the second grouping of addresses with the first potential grouping is a relatively moderate potential grouping.

In some implementations, for example, a first level event may include identification of a certain type of a transaction and/or series of transactions (e.g., a transaction having specific characteristics, a non-anonymized transaction, a transaction tree, and/or other transactions and/or series of transactions described herein). In some implementations, for example, a second level event may include one or more of: at least a threshold number of times that one or more of the same addresses, groupings of addresses, potential groupings of addresses, and/or groups should be grouped or held separate; at least a threshold number of times that one or more addresses from a first grouping, potential grouping, and/or group are co-spent with one or more addresses from a second grouping, potential grouping, and/or group; identification of a transaction series the same as or similar to transaction series 800 (e.g., see FIG. 8); and/or other second level events.

In some implementations, the occurrence of the events defined by the grouping criteria may indicate whether groupings of addresses and/or potential groupings of addresses correspond with a single entity. Individual ones of the events may justify grouping the first grouping of addresses and the second grouping of addresses indicating that the first grouping of addresses and the second grouping of addresses correspond with a single entity. Individual ones of the events may justify holding separate the first grouping of addresses and the second grouping of addresses indicating that the first grouping of addresses and the second grouping of addresses do not correspond with the single entity. In some implementations, individual ones of the events may justify grouping and/or holding separate one or more groupings of addresses and/or potential groupings of addresses such that they are and/or are not associated with the same group.

In some implementations, identity component 132 may be configured to extract identity data from the internet. Identity data may be extracted via web scraping. For example, some entities publically provide a public key they control and/or that corresponds with the entity in order to receive consideration. As such, identity component 132 may compile information associated with public addresses that are publicized. By way of non-limiting example, information regarding the user, identity, activities, actions, associations, and/or other characteristics related to an address posted in a blog may be extracted via web scraping. By way of another example, some entities use related address (e.g., derived from the same private key) across various distributed ledgers. As such, continuing the example, identities may be associated and/or determined across various distributed ledgers (e.g., across blockchains). By way of another non-limiting example, system 100 may send consideration to one or more addresses that may potentially be associated with the same entity (e.g., a relatively moderate strength level potential grouping) to track that consideration and confirm potential groupings of addresses and/or associations (e.g., forcing grouping).

In a non-limiting use case example, identity component 132 may determine addresses that correspond to an AML (i.e., anti money laundering) and/or KYC (i.e., know your customer) business use entities (e.g., Bitpay, Bitstamp, Coinbase, and/or other entities) from which identifying information may be obtainable either privately and/or publically.

In some implementations, identity component 132 may determine identity data that corresponds with individual addresses associated with individual groupings of addresses, potential groupings of addresses, and/or groups. As such, determining a first identity data that corresponds with an individual address associated with a first grouping of addresses, a first potential grouping of addresses, and/or a first group may indicate an identity of an entity that corresponds with the first grouping of addresses, the first potential grouping of addresses, and/or the first group. Identity component 132 may be configured to de-anonymize one or more addresses, groupings of addresses, potential groupings of addresses, groups, and/or transactions included in the distributed ledger.

In some implementations, analysis component 134 may be configured to identify group transactions involving a given grouping of addresses, a given potential grouping of addresses, and/or a given group. The group transactions involving the given grouping of addresses, the given potential grouping of addresses, and/or the given group may include transactions wherein a spending address from which consideration is spent is an address associated with the given grouping of addresses, the given potential grouping of addresses, the given group, and/or a receiving address at which consideration is received is an address associated with the given grouping of addresses, the given potential grouping of addresses, and/or the given group.

In some implementations, the group transactions may include the transactions associated with a group. The group may include addresses associated with one or more groupings of addresses and/or one or more potential groupings of addresses. The group may include addresses, groupings of addresses, and/or potential groupings of addresses that have at least a given strength level of association (e.g., a strong grouping, a relatively strong potential grouping, a relatively weak potential grouping, and/or other strength associations). By way of non-limiting example, addresses associated with a relatively strong potential grouping making up, included in, and/or associated with Group 1 may have a relatively strong association to Group 1. Continuing the non-limiting example, addresses associated with a strong grouping making up, included in, and/or associated with Group 1 may have a strong association to Group 1.

In some implementations, analysis component 134 may be configured to determine participant addresses. Participant addresses may be addresses and/or groupings of addresses included in transactions with an address associated with a given grouping of addresses, potential grouping of addresses, and/or group. The participant addresses determined may include participant sending addresses (e.g., individual address(es), grouping(s) of addresses, potential grouping(s) of addresses, and/or group(s)) from which consideration that is received at an address associated with the given grouping of addresses, the given potential grouping of addresses, and/or the given group is spent and/or participant receiving addresses (e.g., individual address(es), grouping(s) of addresses, potential grouping(s) of addresses, and/or group(s)) at which consideration is received from being spent from an address associated with the given grouping of addresses, potential grouping of addresses, and/or group(s). Participant addresses may be the addresses and/or groupings of addresses the entity associated with the given grouping of addresses, potential grouping of addresses, and/or group sends consideration to and/or receives consideration from. By way of non-limiting example, participant addresses may indicate one or more connections between entities, addresses, groupings of addresses, potential groupings of addresses, and/or groups. In some implementations, participant addresses may provide information regarding the activities and/or involvements of one or more users. For example, if a participant address is associated with a grouping of addresses, potential grouping of addresses, and/or group corresponding to a known Silk Road drug distribution entity, the entity having that address as a participant address may be involved in illegal activity.

In some implementations, analysis component 134 may be configured to identify a set of leading addresses from the participant addresses. The set of leading addresses may include one or more groupings of addresses, potential groupings of addresses, and/or groups. The set of leading addresses may include individual ones of the participant spending addresses (e.g., individual address(es), grouping(s) of addresses, potential grouping(s) of addresses, and/or groups) from which at least a given amount of consideration is spent such that at least the given amount of consideration is received at an address associated with the given grouping of addresses, the given potential grouping of addresses, and/or the given group, and/or individual ones of the participant receiving addresses (e.g., individual address(es), grouping(s) of addresses, potential grouping(s) of addresses, and/or group(s)) at which at least a given amount of consideration is received from being spent from an address associated with the given grouping of addresses, the given potential grouping of addresses, and/or the given group.

In some implementations, the given amount may include a threshold indicating which participant addresses (e.g., individual address(es), grouping(s) of addresses, potential grouping(s) of addresses, and/or groups) the first grouping of addresses, the first potential grouping of addresses, and/or the first group transacts with most often and/or for the highest amount of consideration. As such, by way of non-limiting example, the leading addresses (e.g., individual address(es), grouping(s) of addresses, potential grouping(s) of addresses, and/or group(s)) may be considered the "friends", "top addresses/groups", and/or another custom identification of an entity corresponding with the first grouping of addresses and/or the first potential grouping of addresses. Continuing the example, friends and/or top addresses may include the addresses (e.g., individual address(es), grouping(s) of addresses, potential grouping(s) of addresses, and/or group(s)): to which the first grouping of addresses, the first potential grouping of addresses, and/or the first group sent the most consideration; from which the first grouping, the first potential grouping of addresses, and/or the first group received the most consideration; with which the first grouping of addresses, the first potential grouping of addresses, and/or the first group transacts with most often and/or frequently; and/or with which the first grouping of addresses, the first potential grouping of addresses, and/or the first group has transacted with most recently.

In some implementations, analysis component 134 may be configured to keep track of the most recent participant addresses (e.g., individual address(es), grouping(s) of addresses, potential grouping(s) of addresses, and/or group(s)) a given grouping of addresses, potential grouping of addresses, and/or group has transacted with. Analysis component 134 may be configured to keep track of the most recent participant sending addresses (e.g., individual address(es), grouping(s) of addresses, potential grouping(s) of addresses, and/or group(s)) from which consideration that is received at an address associated with the given grouping of addresses, the given potential grouping of addresses, and/or the given group is spent. In some implementations, analysis component 134 may be configured to keep track of the most recent participant receiving addresses (e.g., individual address(es), grouping(s) of addresses, potential grouping(s) of addresses, and/or group(s)) at which consideration is received from being spent from an address associated with the given grouping of addresses, the given potential grouping of addresses, and/or the given group. For example, the most recent addresses may indicate the "to" and/or "from" addresses with which the given grouping of addresses, the given potential grouping of addresses, and/or the given group transacts (e.g., sends consideration to and/or receives consideration from).

Presentation component 136 may effectuate presentation of a graphical user interface configured to display the group transactions. In some implementations, the graphical user interface may be configured to display the group transactions. The group transactions may be displayed as a graphical representation of consideration spent and/or consideration received by addresses associated with a given grouping of addresses, the given potential grouping of addresses, and/or a given group over time. In some implementations, the graphical representation may display a total amount of consideration associated with the given grouping of addresses, the given potential grouping of addresses, and/or the given group at a given time and/or changes in the total amount of consideration associated with the given grouping of addresses and/or the given potential grouping of addresses over time.

In some implementations, the graphical user interface may be manipulated by a user. The user may be able to zoom and/or view specified periods of time. As such, a user may view a trend of all transactions that are associated with a grouping of addresses, potential grouping of addresses, and/or a group (e.g., across the plurality of addresses that may be associated with one entity) as a whole. In some implementations, a user may view a graphical representation of transactions in a narrower time period (e.g., the user may view each individual transaction). In some implementations, the user may view transactions associated with one or more individual address instead of the associated grouping of addresses and/or potential grouping of addresses.

In some implementations, the user may filter and/or choose to present transactions involving addresses associated with groupings of addresses, potential groupings of addresses, and/or groups that have at least a given strength level. By way of non-limiting example, the user may choose to display all transactions involving addresses associated with strong strength level groupings (e.g., Level 0 groupings) and/or with relatively strong potential groupings (e.g., Level 1-Level 3 potential groupings). In some implementations, for example, the user may choose to display all transactions involving addresses having at least a given strength level association (e.g., via a strong grouping, relatively strong potential grouping, and/or other strength level grouping/potential grouping) with a given group. As such, only strong groupings, relatively strong potential groupings, and/or other strong associations may be presented to the user via the graphical user interface. In some implementations, if the user wants a broader and/or narrower range of addresses possibly associated with a given entity, the user can select to present transactions involving addresses associated with at least a given level grouping and/or at least a given level potential grouping (e.g. Level 3 or stronger) such that only transactions involving addresses having the desired level of association with a group are presented. As such, a user may be able to analyze transactions included in the distributed ledger at various levels and/or layers (e.g., more inclusive to less inclusive). In some implementations, the user may summarize transaction data by aggregating metadata about transactions. For example, the graphical user interface may show the top 100 recipients of consideration sent from a grouping of addresses, a potential grouping of addresses, and/or a group over a period of time. By way of another example, the graphical user interface may show the top 100 senders of consideration to a grouping of addresses, a potential grouping of addresses, and/or a group over a period of time. In some implementations, the user may summarize transaction data by aggregating the total of received and sent consideration to and from leading and/or participant addresses (e.g., termed "friends" in an example implementation).

In some implementations, the graphical user interface may be used to analyze one or more transactions and/or a history of transactions associated with a grouping of addresses, a potential grouping of addresses, and/or a group to further connect, separate, and/or otherwise update the groupings of addresses and/or the potential groupings of addresses.

Figure 9:
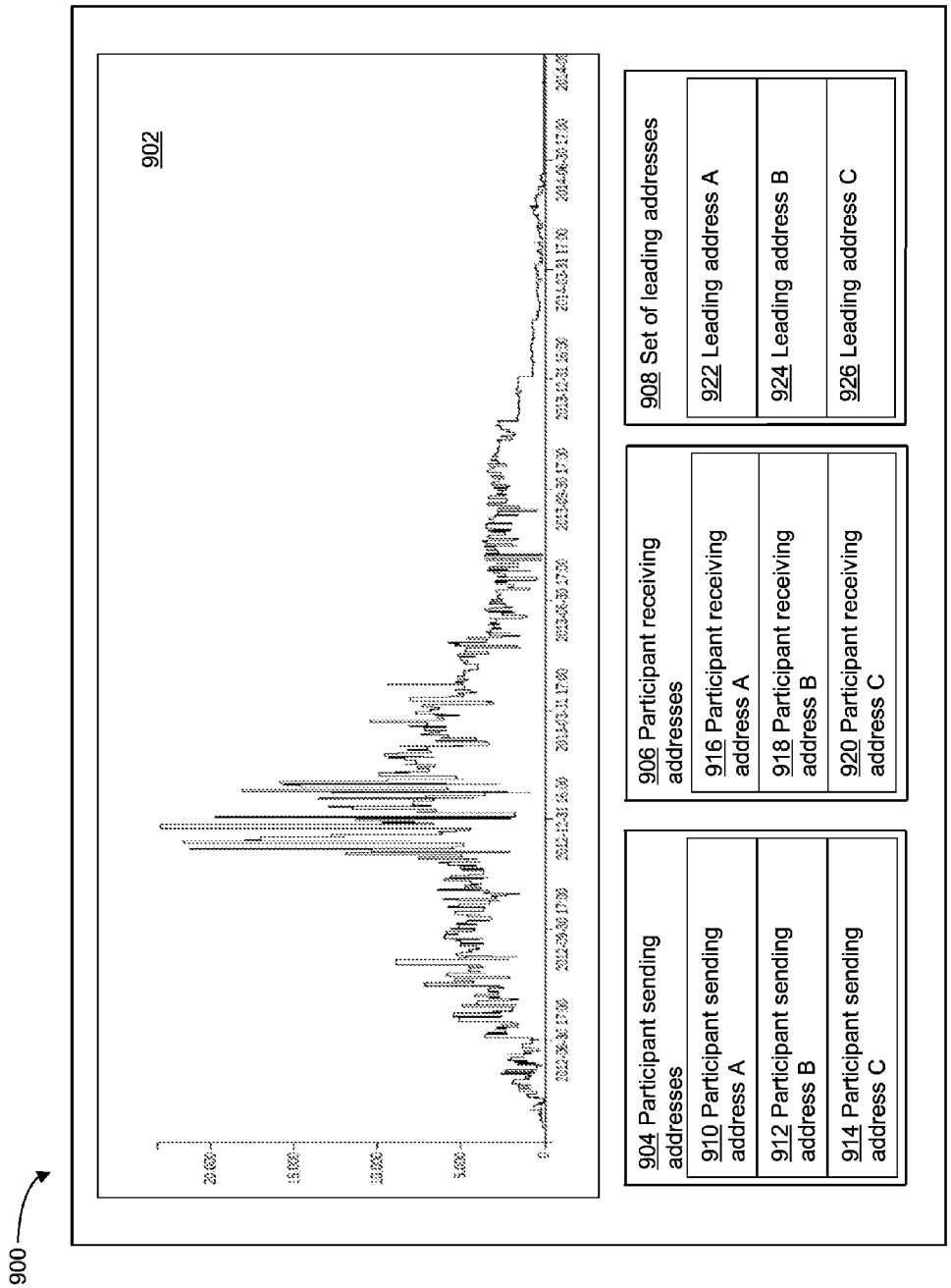
FIG. 9 illustrates a graphical user interface, in accordance with one or more implementations.

FIG. 9 illustrates a graphical user interface 900 in accordance with one or more implementations. Graphical user interface 900 may be the same as or similar to the graphical user interface presented by presentation component 136. Graphical user interface 900 may include one or more fields for displaying information via a display of a client computing platform (e.g., client computing platform(s) 140). The one or more fields may include field 902, field 904, field 906, field 908, and/or other fields. In some implementations, field 902 may be configured to display a graphical representation of consideration spent and/or consideration received by addresses associated with a given grouping of addresses, a given potential grouping of addresses, and/or a given group over time. In some implementations, field 904 may be configured to display the participant sending addresses from which the most consideration that has been received at an address associated with the given grouping, the given potential grouping of addresses, and/or a given group was spent. For example, field 904 may be configured to display one or more sources of the consideration received by addresses associated with the given grouping, the given potential grouping of addresses, and/or the given group. Participant spending (e.g., source) addresses may include one or more addresses, groupings of addresses, and/or potential groupings of addresses from which consideration that has been received at an address associated with the given grouping of addresses, the given potential grouping of addresses, and/or the given group was spent. Field 904 may include one or more of participant sending address A 910, participant spending address B 912, participant spending address C 914, and/or other participant spending addresses. In some implementations, field 904 may display the aggregate amount of consideration received from individual participant sending addresses. In some implementations field 904 may include the top 25 participant sending addresses (e.g., the "From Top 25") including the addresses, groupings of addresses, potential groupings of addresses, and/or groups that have sent the most consideration to the given grouping, the given potential grouping, and/or the given group (e.g., addresses where the most consideration has been received from by the given grouping of addresses and/or potential grouping of addresses).

In some implementations, field 906 may be configured to display the participant receiving addresses at which the most consideration has been received from being spent from an address associated with the given grouping, the given potential grouping of addresses, and/or the given group. For example, field 906 may be configured to display one or more destinations of the consideration spent by addresses associated with the given grouping, the given potential grouping, and/or the given group of addresses. Participant receiving (e.g., destination) addresses may include one or more addresses, groupings of addresses, potential groupings of addresses, and/or groups at which consideration has been received from being spent from an address associated with the given grouping, the given potential grouping of addresses, and/or the given group. Field 906 may include one or more of participant receiving address A 916, participant receiving address B 918, participant receiving address C 920, and/or other participant receiving addresses. In some implementations, field 906 may display the aggregate amount of consideration sent to individual participant receiving addresses. In some implementations field 906 may include the top 25 participant receiving addresses (e.g., the "To Top 25") including the addresses, groupings of addresses, potential groupings of addresses, and/or groups that have received the most consideration from the given grouping, the given potential grouping, and/or the given group (e.g., addresses to which the given grouping of addresses and/or potential grouping of addresses has sent the most consideration to). As such, field 904 and/or field 906 may be configured to display participant addresses with which the given grouping of addresses, the given potential grouping of addresses, and/or the given group exchanges the most consideration.

Field 908 may be configured to display the set of leading addresses identified from the participant addresses as described herein. The set of leading addresses may include one or more addresses, groupings of addresses, potential groupings of addresses, and/or groups with which the given grouping of addresses, the given potential grouping of addresses, and/or the given group exchanges the most aggregated consideration. For example, field 908 may be configured to display the set of leading addresses as the "friends", "top addresses/groups", and/or by another custom identification of the given grouping of addresses and/or the given potential grouping of addresses. The consideration spent from and received at individual participant addresses may be added to form the aggregated consideration associated with an individual participant address and/or used to determine the set of leading addresses (e.g., the addresses, groupings of addresses, and/or potential groupings of addresses having the highest aggregated consideration). Field 908 may include one or more of leading address A 922, leading address B 924, leading address C 926, and/or other leading addresses. In some implementations, field 908 may display the aggregate consideration associated with each individual leading address. By way of non-limiting example, if Group 500 (e.g., addresses associated with Group 500) has sent a total of ฿10 to a given leading address and Group 500 has received a total of ฿6 from the given leading address, the aggregate consideration associated with the given leading address may include ฿16.

The system(s) and method(s) for analyzing transactions in a distributed ledger as described herein may be used for various applications and the disclosure and examples provided are not intended to be limiting. In some implementations, for example, the various applications may include: identification of illegal and/or criminal activity; identification of entities and/or individuals engaged in illegal and/or criminal activity; coin and/or address vetting; identification of financial information; identification for identifying trades and/or exchanges; creating financial markets trading indicators and other metadata by analyzing payment flows; assessing market capacity and growth rates of small or large companies that transact on one or more blockchains; enabling financial institutions to assess compliance needs for themselves; enabling financial institutions to assess compliance requirements for customers that utilize blockchains; enabling financial institutions to implement procedures which may result in the filing of one or more SARs (Suspicious Activity Reports) under the Bank Secrecy Act; enabling financial institutions to implement procedures which may result in the filing of the equivalent of a SAR in a foreign jurisdiction; assessing asset hiding or money laundering behavior whether in criminal circumstances, or domestic disputes (e.g. Business disputes or divorce); assessing tax liability; identifying possible tax evasion or non-compliance; creation of subpoenas or other actionable data for law enforcement or government agencies to determine the identity of a party of interest; recovery of coins that have been stolen by indicating the final owner of coins, or a transacting party with a party of interest; and/or other applications.

In a non-limiting use case, the system(s) and method(s) described herein may be used for predicting, determining, and/or identifying trading strategies and price movements on blockchain exchanges. The system may identify exchanges based on a groupings of addresses and/or potential groupings of addresses that correspond to an exchange group. Since exchanges typically involve a large quantity of consideration and the verification protocol of the blockchain requires the nodes to verify that the consideration has not been previously spent, the exchanges appear in the blockchain before they are credited to trading customer accounts. As such, very strong trading indicators may be identified ahead of time by analyzing a grouping of addresses, potential grouping of addresses, and/or group corresponding to an exchange group and its depositors/traders. In some circumstances, the trading signal can occur over an hour before a trade would be required.

In a non-limiting use case, the system(s) and method(s) described herein may be used for determination of possibly related parties by reporting on possible merge and/or group candidates and enabling small sends of consideration to possibly related parties. The system may identify possibly related parties that are weak potential grouping candidates (e.g., addresses, groupings of addresses, and/or potential groupings of addresses associated with a potential grouping of addresses having a Level 5 or greater strength level). Then an operator of the system could choose to send small amounts of consideration to the candidates in order to determine whether or not a group/merge transaction will occur (e.g., an event that justifies grouping the addresses, groupings of addresses, and/or potential groupings of addresses associated with the Level 5 or greater potential grouping of addresses).

Returning to FIG. 1, in some implementations, ledger platform 142 may be configured to provide and/or enable (e.g., via an interface) identification and/or collection of transactions included in the distributed ledger. In some implementations, system 100 may be configured to interface with one or more public distributed ledgers, private distributed ledgers, and/or other distributed ledgers. By way of non-limiting example, a public distributed ledger may include the Bitcoin blockchain.

In some implementations, server(s) 110, client computing platform(s) 140, ledger platform 142, and/or external resource(s) 144 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 110, client computing platform(s) 140, ledger platform 142, and/or external resource(s) 144 may be operatively linked via some other communication media.

A given client computing platform 140 may include one or more processors configured to execute machine-readable instructions. The machine-readable instructions may be configured to enable an expert or user associated with the given client computing platform 140 to interface with system 100, ledger platform 142, external resource(s) 144, and/or provide other functionality attributed herein to client computing platform(s) 140. By way of non-limiting example, the given client computing platform 140 may include one or more of a desktop computer, a laptop computer, a handheld computer, a tablet computing platform, a netbook, a smartphone, a gaming console, and/or other computing platforms.

Ledger platform 142 may include a system, computing platform(s), server(s), electronic storage, external resource(s), processor(s), and/or other components associated with a distributed ledger. System 100, client computing platform(s) 140, external resource(s) 144, and/or other components may be configured to communicate with ledger platform 142. In some implementations, ledger platform 142 may include one or more server(s) participating in connection with server(s) 110 to provide a distributed ledger.

External resource(s) 144 may include sources of information, storage sources (e.g., databases), hosts and/or providers of transaction platforms outside of system 100, external entities participating with system 100, and/or other resources. In some implementations, some or all of the functionality attributed herein to external resource(s) 144 may be provided by resources included in system 100.

Server(s) 110 may include electronic storage 146, one or more processor(s) 120, and/or other components. Illustration of server(s) 110 in FIG. 1 is not intended to be limiting. Server(s) 110 may include a plurality of hardware, software, and/or firmware components operating together to provide the functionality attributed herein to server(s) 110. For example, server 110 may be implemented by a cloud of computing platforms operating together as server 110.

Electronic storage 146 may comprise non-transitory storage media that electronically stores information. The electronic storage media of electronic storage 146 may include one or both of system storage that is provided integrally (i.e., substantially non-removable) with a respective component of system 100 and/or removable storage that is removably connectable to a respective component of system 100 via, for example, a port (e.g., a USB port, a firewire port, etc.) or a drive (e.g., a disk drive, etc.). Electronic storage 146 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 146 may include one or more virtual storage resources (e.g., cloud storage, a virtual private network, and/or other virtual storage resources). Electronic storage 146 may store software algorithms, information determined by a processor, and/or other information that enables components of system 100 to function as described herein.

Processor(s) 120 may be configured to provide information processing capabilities in server(s) 110. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. Processor(s) 120 may be configured to execute machine-readable instructions 121. Machine-readable instructions 121 may include components 122, 124, 126, 128, 130, 132, 134, 136, and/or other components. The processor(s) 120 may be configured to execute components 122, 124, 126, 128, 130, 132, 134, 136, and/or other components by software; hardware; firmware; some combination of software, hardware, and/or firmware; and/or other mechanisms for configuring processing capabilities on processor(s) 120.

The description of the functionality provided by the different components 122, 124, 126, 128, 130, 132, 134, and/or 136 described herein is for illustrative purposes, and is not intended to be limiting, as any of components 122, 124, 126, 128, 130, 132, 134, and/or 136 may provide more or less functionality than is described. For example, one or more of components 122, 124, 126, 128, 130, 132, 134, and/or 136 may be eliminated, and some or all of its functionality may be provided by other ones of components 122, 124, 126, 128, 130, 132, 134, and/or 136. As another example, processor(s) 120 may be configured to execute one or more additional computer readable instruction components that may perform some or all of the functionality attributed below to one of components 122, 124, 126, 128, 130, 132, 134, and/or 136.

Figure 10:
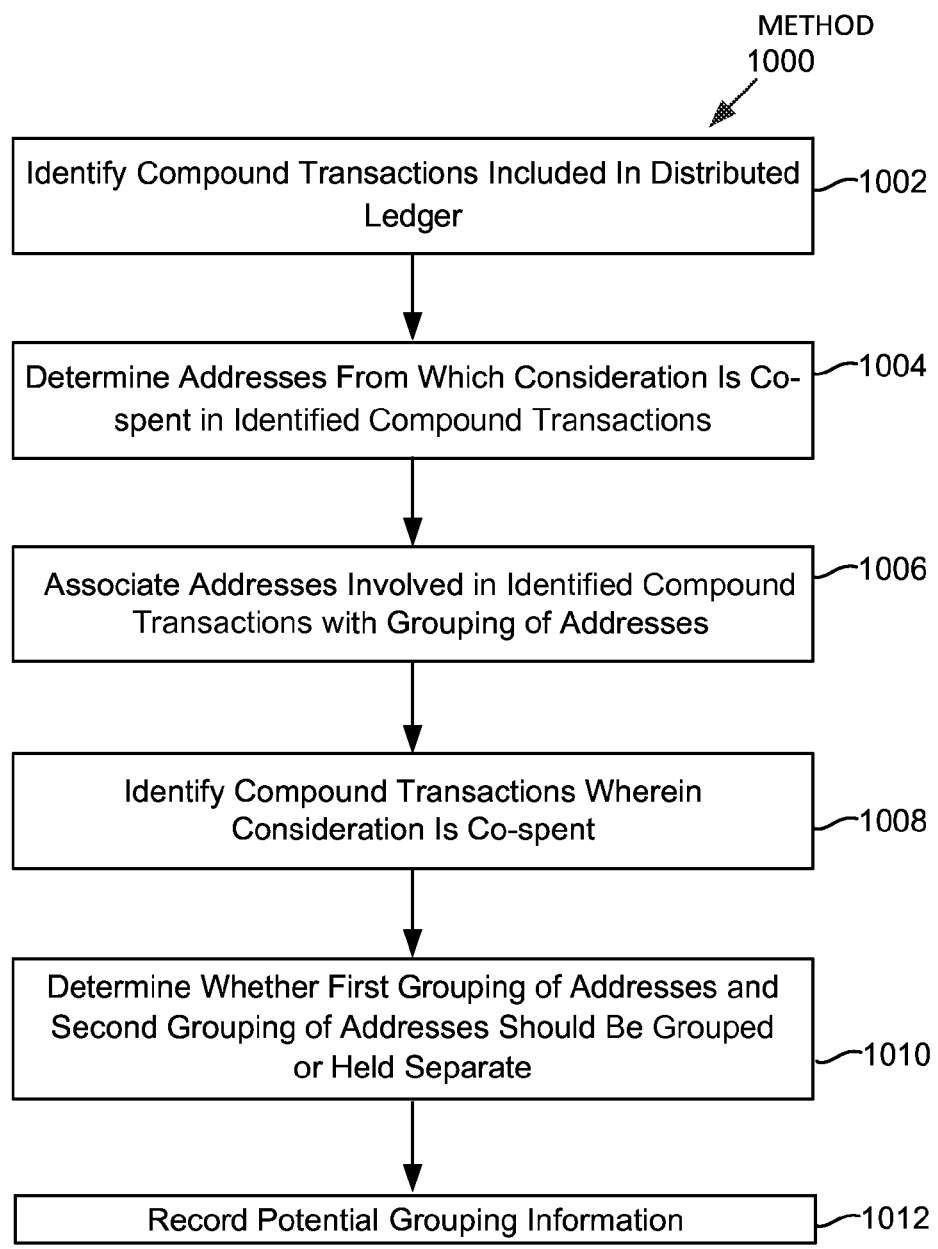
FIG. 10 illustrates a method for analyzing transactions in a distributed ledger, in accordance with one or more implementations.

FIG. 10 illustrates a method 1000 for analyzing transactions in a distributed ledger, in accordance with one or more implementations. The method depicted in FIG. 8 is described in greater detail herein. The described operations may be accomplished using some or all of system 100 components described in detail herein and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

In some implementations, one or more operations of method 1000 may be implemented in and/or by one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At an operation 1002, compound transactions included in the distributed ledger may be identified. The compound transactions may include multiple addresses from which consideration is co-spent. In some implementations, operation 1002 may be performed by an identification component that is the same as or similar to identification component 122 (shown in FIG. 1 and described herein).

At an operation 1004, addresses from which consideration is co-spent in the identified compound transactions may be determined. In some implementations, operation 1004 may be performed by an address component that is the same as or similar to address component 124 (shown in FIG. 1 and described herein).

At an operation 1006, the addresses involved in an individual one of the identified compound transactions may be associated with a grouping of addresses. In some implementations, operation 1006 may be performed by a grouping component that is the same as or similar to grouping component 126 (shown in FIG. 1 and described herein).

At an operation 1008, the compound transactions wherein consideration is co-spent from an address associated with a first grouping of addresses and an address associated with a second grouping of addresses may be identified. In some implementations, compound transactions wherein consideration is co-spent from an address associated with a first potential grouping of addresses and/or a first group and an address associated with a second potential grouping of addresses and/or a second group may be identified. In some implementations, operation 1008 may be performed by an identification component that is the same as or similar to identification component 122 (shown in FIG. 1 and described herein).

At an operation 1010, whether the first grouping of addresses and the second grouping of addresses should be grouped or held separate may be determined. Whether the first grouping of addresses and the second grouping of addresses should be grouped or held separate may be determined based on grouping criteria. The grouping criteria may define events that justify grouping or holding separate the first grouping of addresses and the second grouping of addresses. In some implementations, operation 1010 may be performed by a determination component that is the same as or similar to determination component 128 (shown in FIG. 1 and described herein).

At an operation 1012, potential grouping information may be recorded. Potential grouping information may be recorded based on the determination of whether the first grouping of addresses and the second grouping of addresses should be grouped or held separate. The potential grouping information may indicate whether the first grouping of addresses and the second grouping of addresses should be associated with a first potential grouping. In some implementations, operation 1012 may be performed by a potential grouping component that is the same as or similar to potential grouping component 130 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for analyzing transactions in a distributed ledger, the system comprising:
  one or more physical computer processors configured by machine-readable instructions to:
    identify compound transactions included in the distributed ledger, wherein the compound transactions include multiple addresses from which consideration is co-spent;
    determine the addresses from which consideration is co-spent in the identified compound transactions;
    associate the addresses involved in an individual one of the identified compound transactions with a grouping of addresses;
    identify the compound transactions wherein consideration is co-spent from an address associated with a first grouping of addresses and an address associated with a second grouping of addresses;
    determine whether the first grouping of addresses and the second grouping of addresses should be grouped or held separate based on grouping criteria, wherein the grouping criteria define events that justify grouping or holding separate the first grouping of addresses and the second grouping of addresses; and
    record potential grouping information based on the determination of whether the first grouping of addresses and the second grouping of addresses should be grouped or held separate, the potential grouping information indicating whether the first grouping of addresses and the second grouping of addresses should be associated with a first potential grouping.

2. The system of claim 1, wherein the one or more physical computer processors are further configured by machine-readable instructions to:
  group the first grouping of addresses and the second grouping of addresses with the first potential grouping responsive to the potential grouping information indicating that the first grouping of addresses and the second grouping of addresses should be associated with the first potential grouping.

3. The system of claim 1, wherein the one or more physical computer processors are further configured by machine-readable instructions to:
  determine whether the determined addresses from which consideration is co-spent in the identified compound transactions have been previously associated with one or more groupings of addresses and/or one or more potential groupings of addresses;
  wherein associating the addresses involved in the identified compound transactions with a grouping of addresses occurs responsive to a determination that the determined addresses have not been previously associated with the one or more groupings of addresses and/or the one or more potential groupings of addresses.

4. The system of claim 1, wherein the one or more physical computer processors are further configured by machine-readable instructions to:
  determine whether the determined addresses from which consideration is co-spent in the identified compound transactions are associated with one or more groupings of addresses and/or one or more potential groupings of addresses;
  wherein associating the addresses involved in the identified compound transactions with a grouping of addresses occurs responsive to a determination that one or more of the determined addresses are associated with no more than one of the groupings of addresses and/or no more than one of the potential groupings of addresses.

5. The system of claim 1, wherein the potential grouping information indicates a strength level of potential groupings, wherein a relatively strong strength level indicates that the first grouping of addresses and the second grouping of addresses should be associated with the first potential grouping and a relatively weak strength level indicates that the first grouping of addresses and the second grouping of addresses should not be associated with the first potential grouping.

6. The system of claim 5, wherein the relatively strong strength level includes a first range of relatively strong strength levels that indicate the first grouping of addresses and the second grouping of addresses should be associated with the first potential grouping and the relatively weak strength level includes a second range of relatively weak strength levels that indicate the first grouping of addresses and the second grouping of addresses should not be associated with the first potential grouping.

7. The system of claim 1, wherein the grouping criteria define varying levels of individual ones of the events that justify grouping the first grouping of addresses and the second grouping of addresses such that, responsive to an occurrence of a first level event, the determination that the first grouping of addresses and the second grouping of addresses should be grouped is certain and the potential grouping information recorded indicates that the association of the first grouping of addresses and the second grouping of addresses with the first potential grouping is a relatively strong potential grouping, and responsive to an occurrence of a second level event, the determination that the first grouping of addresses and the second grouping of addresses should be grouped is uncertain and the potential grouping information recorded indicates that the association of the first grouping of addresses and the second grouping of addresses with the first potential grouping is a relatively moderate potential grouping.

8. The system of claim 1, wherein the one or more physical computer processors are further configured by machine-readable instructions to:
identify an anonymized transaction from the identified compound transactions, the anonymized transaction involving spending addresses from which consideration is spent wherein the spending addresses are associated with different groupings of addresses and/or different potential groupings of addresses, such that individual ones of the spending addresses are all associated with different individual ones of the groupings of addresses and/or different individual ones of the potential groupings of addresses;
wherein the potential grouping information recorded indicates that the groupings of addresses should not be associated with a same potential grouping.

9. The system of claim 1, wherein the one or more physical computer processors are further configured by machine-readable instructions to:
identify a transaction tree included in the distributed ledger, the transaction tree including transactions involving an originating address from which consideration is spent to multiple intermediary addresses and an ending address at which consideration is received from the multiple intermediary addresses, wherein the originating address and the ending address are both associated with a single grouping of addresses and/or a single potential grouping of addresses; and
associate the multiple intermediary addresses with the single potential grouping of addresses.

10. The system of claim 1, wherein the one or more physical computer processors are further configured by machine-readable instructions to:
extract identity data from the internet via web scraping; and
determine the identity data that corresponds with individual addresses associated with individual groupings of addresses, such that determining a first identity data that corresponds with an individual address associated with the first grouping of addresses and/or the first potential grouping of addresses indicates an identity of an entity that corresponds with the first grouping of addresses and/or the first potential grouping of addresses.

11. The system of claim 1, wherein occurrence of the events defined by the grouping criteria indicate whether groupings of addresses and/or potential groupings of addresses correspond with a single entity, such that individual ones of the events that justify grouping the first grouping of addresses indicate that the first grouping of addresses and the second grouping of addresses correspond with a single entity, and individual ones of the events that justify holding separate the first grouping of addresses and the second grouping of addresses indicate that the first grouping of addresses and the second grouping of addresses do not correspond with the single entity.

12. The system of claim 1, wherein the one or more physical computer processors are further configured by machine-readable instructions to:
identify group transactions involving the first grouping of addresses and/or the first potential grouping of addresses, wherein the group transactions involving the first grouping of addresses and/or the first potential grouping of addresses include transactions wherein a spending addresses from which consideration is spent is an address associated with the first grouping of addresses and/or the first potential grouping of addresses, and/or a receiving address at which consideration is received is an address associated with the first grouping of addresses and/or the first potential grouping of addresses; and
effectuate presentation of a graphical user interface, wherein the graphical user interface is configured to display the group transactions.

13. The system of claim 12, wherein the graphical user interface is further configured to display the group transactions as a graphical representation of consideration spent and consideration received by addresses associated with the first grouping of addresses and/or the first potential grouping of addresses over time such that the graphical representation displays a total amount of consideration associated with the first grouping of addresses and/or the first potential grouping of addresses at a given time and/or changes in the total amount of consideration associated with the first grouping of addresses and/or the first potential grouping of addresses over time.

14. The system of claim 12, wherein the one or more computer processors are further configured by machine-readable instructions to:
determine participant addresses included in transactions with an address associated with the first grouping of addresses, wherein the participant addresses determined include participant sending addresses from which consideration that is received at an address associated with the first grouping of addresses is spent, and participant receiving addresses at which consideration is received from being spent from an address associated with the first grouping of addresses.

15. The system of claim 14, wherein the one or more computer processors are further configured by machine-readable instructions to:

identify a set of leading addresses from the participant addresses, wherein the set of leading addresses includes individual ones of the participant spending addresses from which at least a first amount of consideration is spent such that at least the first amount of consideration is received at an address associated with the first grouping of addresses, and individual ones of the participant receiving addresses at which at least a second amount of consideration is received from being spent from an address associated with the first grouping of addresses.

16. A method for analyzing transactions in a distributed ledger, the method being implemented on a computer system having one or more physical processors configured by machine-readable instructions which, when executed, perform the method, the method comprising:

identifying, by the computer system, compound transactions included in the distributed ledger, wherein the compound transactions include multiple addresses from which consideration is co-spent;

determining, by the computer system, the addresses from which consideration is co-spent in the identified compound transactions;

associating, by the computer system, the addresses involved in an individual one of the identified compound transactions with a grouping of addresses;

identifying, by the computer system, the compound transactions wherein consideration is co-spent from an address associated with a first grouping of addresses and an address associated with a second grouping of addresses;

determining, by the computer system, whether the first grouping of addresses and the second grouping of addresses should be grouped or held separate based on grouping criteria, wherein the grouping criteria define events that justify grouping or holding separate the first grouping of addresses and the second grouping of addresses; and recording, by the computer system, potential grouping information based on the determination of whether the first grouping of addresses and the second grouping of addresses should be grouped or held separate, the potential grouping information indicating whether the first grouping of addresses and the second grouping of addresses should be associated with a first potential grouping.

17. The method of claim 16, further comprising:

grouping, by the computer system, the first grouping of addresses and the second grouping of addresses with the first potential grouping responsive to the potential grouping information indicating that the first grouping of addresses and the second grouping of addresses should be associated with the first potential grouping.

18. The method of claim 16, further comprising:

determining, by the computer system, whether the determined addresses from which consideration is co-spent in the identified compound transactions have been previously associated with one or more groupings of addresses and/or one or more potential groupings of addresses;

wherein associating the addresses involved in the identified compound transactions with a grouping of addresses occurs responsive to a determination that the determined addresses have not been previously associated with the one or more groupings of addresses and/or the one or more potential groupings of addresses.

19. The method of claim 16, further comprising:

determining, by the computer system, whether the determined addresses from which consideration is co-spent in the identified compound transactions are associated with one or more groupings of addresses and/or one or more potential groupings of addresses;

wherein associating the addresses involved in the identified compound transactions with a grouping of addresses occurs responsive to a determination that one or more of the determined addresses are associated with no more than one of the groupings of addresses and/or no more than one of the potential groupings of addresses.

20. The method of claim 16, wherein the potential grouping information indicates a strength level of potential groupings, wherein a relatively strong strength level indicates that the first grouping of addresses and the second grouping of addresses should be associated with the first potential grouping and a relatively weak strength level indicates that the first grouping of addresses and the second grouping of addresses should not be associated with the first potential grouping.

21. The method of claim 20, wherein the relatively strong strength level includes a first range of relatively strong strength levels that indicate the first grouping of addresses and the second grouping of addresses should be associated with the first potential grouping and the relatively weak strength level includes a second range of relatively weak strength levels that indicate the first grouping of addresses and the second grouping of addresses should not be associated with the first potential grouping.

22. The method of claim 16, wherein the grouping criteria define varying levels of individual ones of the events that justify grouping the first grouping of addresses and the second grouping of addresses such that, responsive to an occurrence of a first level event, the determination that the first grouping of addresses and the second grouping of addresses should be grouped is certain and the potential grouping information recorded indicates that the association of the first grouping of addresses and the second grouping of addresses with the first potential grouping is a relatively strong potential grouping, and responsive to an occurrence of a second level event, the determination that the first grouping of addresses and the second grouping of addresses should be grouped is uncertain and the potential grouping information recorded indicates that the association of the first grouping of addresses and the second grouping of addresses with the first potential grouping is a relatively moderate potential grouping.

23. The method of claim 16, further comprising:

identifying, by the computer system, an anonymized transaction from the identified compound transactions, the anonymized transaction involving spending addresses from which consideration is spent wherein the spending addresses are associated with different groupings of addresses, such that individual ones of the spending addresses are all associated with different individual ones of the groupings of addresses;

wherein the potential grouping information recorded indicates that the groupings of addresses should not be associated with a same potential grouping.

24. The method of claim 16, further comprising:

identifying, by the computer system, a transaction tree included in the distributed ledger, the transaction tree including transactions involving an originating address from which consideration is spent to multiple intermediary addresses and an ending address at which consideration is received from the multiple intermediary addresses, wherein the originating address and the ending address are both associated with a single grouping of addresses and/or a single potential grouping of addresses; and associating, by the computer system, the multiple intermediary addresses with the single potential grouping of addresses.

25. The method of claim 16, further comprising:

extracting, by the computer system, identity data from the internet via web scraping; and determining, by the computer system, the identity data that corresponds with individual addresses associated with individual groupings and/or individual potential groupings of addresses, such that determining a first identity data that corresponds with an individual address associated with the first grouping of addresses and/or the first potential grouping of addresses indicates an identity of an entity that corresponds with the first grouping of addresses and/or the first potential grouping of addresses.

26. The method of claim 16, wherein occurrence of the events defined by the grouping criteria indicate whether groupings of addresses and/or potential groupings of addresses correspond with a single entity, such that individual ones of the events that justify grouping the first grouping of addresses indicate that the first grouping of addresses and the second grouping of addresses correspond with a single entity, and individual ones of the events that justify holding separate the first grouping of addresses and the second grouping of addresses indicate that the first grouping of addresses and the second grouping of addresses do not correspond with the single entity.

27. The method of claim 16, further comprising:

identifying, by the computer system, group transactions involving the first grouping of addresses and/or the first potential grouping of addresses, wherein the group transactions involving the first grouping of addresses and/or the first potential grouping of addresses include transactions wherein a spending addresses from which consideration is spent is an address associated with the first grouping of addresses and/or the first potential grouping of addresses, and/or a receiving address at which consideration is received is an address associated with the first grouping of addresses and/or the first potential grouping of addresses; and effectuating, by the computer system, presentation of a graphical user interface, wherein the graphical user interface is configured to display the group transactions.

28. The method of claim 27, wherein the graphical user interface is further configured to display the group transactions as a graphical representation of consideration spent and consideration received by addresses associated with the first grouping of addresses and/or the first potential grouping of addresses over time such that the graphical representation displays a total amount of consideration associated with the first grouping of addresses and/or the first potential grouping of addresses at a given time and/or changes in the total amount of consideration associated with the first grouping of addresses and/or the first potential grouping of addresses over time.

29. The method of claim 27, further comprising:

determining, by the computer system, participant addresses included in transactions with an address associated with the first grouping of addresses and/or the first potential grouping of addresses, wherein the participant addresses determined include participant sending addresses from which consideration that is received at an address associated with the first grouping of addresses and/or the first potential grouping of addresses is spent, and participant receiving addresses at which consideration is received from being spent from an address associated with the first grouping of addresses and/or the first potential grouping of addresses.

30. The method of claim 29, further comprising:

identifying, by the computer system, a set of leading addresses from the participant addresses, wherein the set of leading addresses includes individual ones of the participant spending addresses from which at least a first amount of consideration is spent such that at least the first amount of consideration is received at an address associated with the first grouping of addresses and/or the first potential grouping of addresses, and individual ones of the participant receiving addresses at which at least a second amount of consideration is received from being spent from an address associated with the first grouping of addresses and/or the first potential grouping of addresses.

* * * * *